(12) United States Patent
Mitchell et al.

(10) Patent No.: US 7,389,960 B2
(45) Date of Patent: Jun. 24, 2008

(54) PASSENGER CABIN SEAT POWER BUS

(75) Inventors: Bradley J. Mitchell, Snohomish, WA (US); Kevin S. Callahan, Shoreline, WA (US); Trevor M. Laib, Woodinville, WA (US); Robert T. Johnson, Everett, WA (US); Darrell E. Santala, Marysville, WA (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 11/090,874

(22) Filed: Mar. 25, 2005

(65) Prior Publication Data

US 2005/0258676 A1     Nov. 24, 2005

Related U.S. Application Data

(60) Provisional application No. 60/556,826, filed on Mar. 27, 2004.

(51) Int. Cl.
*B64D 11/00* (2006.01)
(52) U.S. Cl. ..................................... 244/118.5
(58) Field of Classification Search ............. 244/118.6, 244/129.1, 1 R, 118.5; 455/3.06; 370/257, 370/421, 489; 297/217.3; 439/110, 112, 439/121, 116, 119, 535
See application file for complete search history.

(56) References Cited

U.S. PATENT DOCUMENTS

| 4,428,078 | A | | 1/1984 | Kuo |
| 4,763,360 | A | | 8/1988 | Daniels et al. |
| 4,774,514 | A | * | 9/1988 | Hildebrandt et al. ........ 340/971 |
| 4,794,592 | A | * | 12/1988 | Caine et al. ................. 370/257 |
| 4,853,555 | A | * | 8/1989 | Wheat .......................... 307/9.1 |
| 6,435,884 | B1 | * | 8/2002 | Tada ........................... 439/110 |
| 6,492,594 | B1 | * | 12/2002 | Magyar et al. ................ 174/97 |
| 6,587,474 | B1 | * | 7/2003 | Griessbach ................. 370/446 |
| 6,601,798 | B2 | | 8/2003 | Cawley |
| 2002/0070591 | A1 | * | 6/2002 | Nivet ....................... 297/217.3 |

* cited by examiner

*Primary Examiner*—Tien Dinh
(74) *Attorney, Agent, or Firm*—Harness, Dickey & Pierce, P.L.C.

(57) ABSTRACT

A conductive bus device and method operable to distribute signals throughout a platform. The bus delivers signals to any number of select locations within the platform, such as to seats mounted to a seat track. The bus is mounted beneath a floor of the platform. The signals can be transmitted between the power bus and the passenger seats using a conductor that extends from the passenger seats to the bus through a opening in the seat track. The bus device and method eliminates the need to run separate connections between a signal source and each seat. This device and method significantly reduce the cost, energy, and time necessary to wire each seat individually.

17 Claims, 25 Drawing Sheets

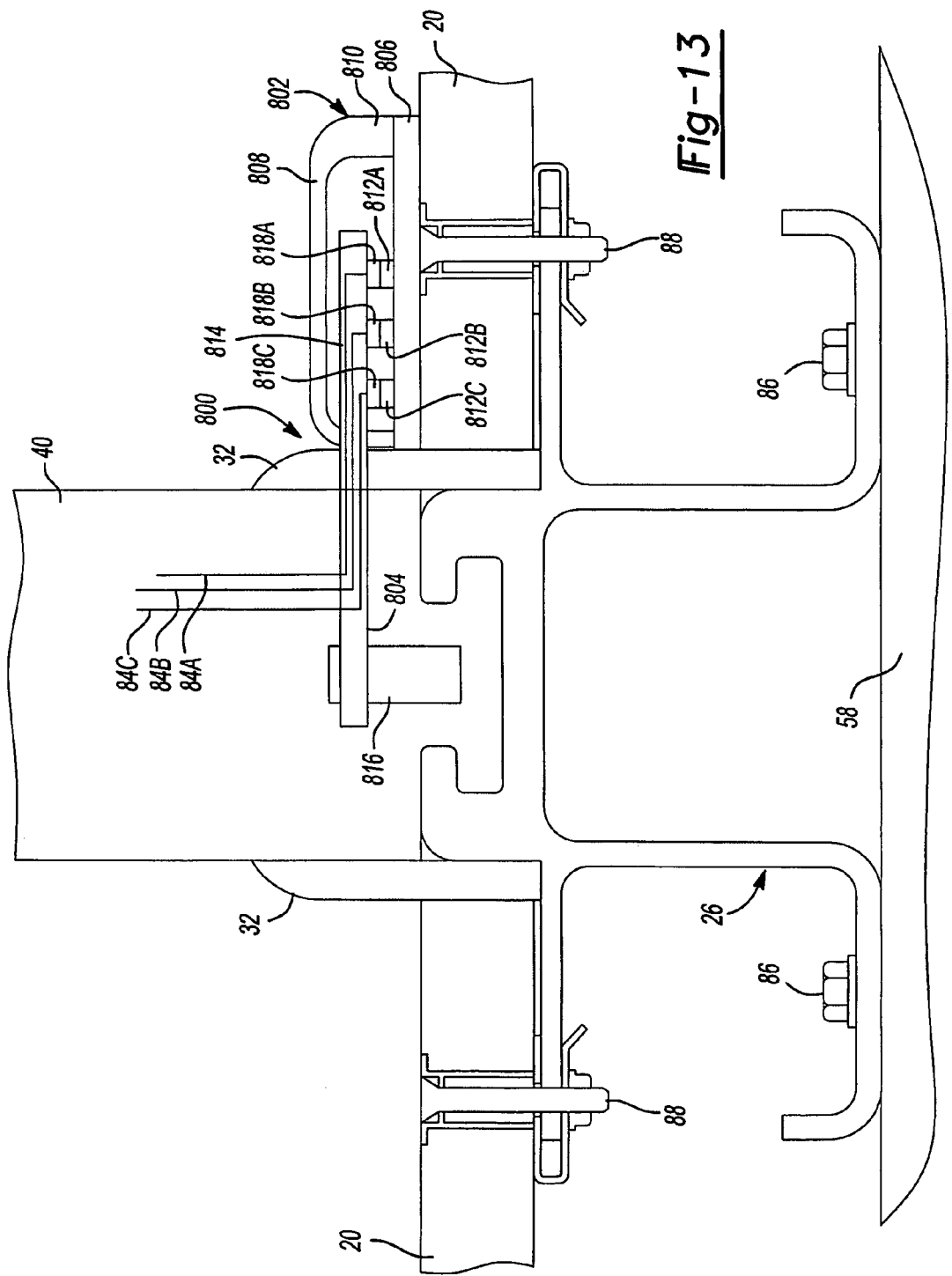

PASSENGER CABIN SEAT POWER BUS

CROSS-REFERENCE TO RELATED APPLICATIONS

This application claims the benefit of U.S. provisional application Ser. No. 60/556,826 filed on Mar. 27, 2004, which is incorporated herein by reference.

The following applications are also incorporated by reference herein: provisional application Ser. No. 60/557,044 filed on Mar. 27, 2004; provisional application Ser. No. 60/556,823 filed on Mar. 27, 2004; provisional application Ser. No. 60/556,747 filed on Mar. 27, 2004; provisional application Ser. No. 60/556,748, filed on Mar. 27, 2004; U.S. application Ser. No. 10/810,324 filed on Mar. 27, 2004; U.S. application Ser. No. 10/898,729 filed on Jul. 23, 2004; U.S. application Ser. No. 10/936,004 filed on Sep. 8, 2004; U.S. application Ser. No. 10/983,906 filed on Nov. 8, 2004; and U.S. application Ser. No. 10/943,035 filed on Sep. 16, 2004.

FIELD OF THE INVENTION

The present invention relates to mobile platform electronic systems. In particular, the present invention relates to a power bus that provides current and/or data to aircraft passenger seats in a mobile platform, such as an aircraft.

BACKGROUND OF THE INVENTION

Commercial aircraft passengers are increasingly demanding in-flight entertainment (IFE) and electrical power outlets to operate various electronic devices, such as laptop computers, at their seats. To provide the passenger with such features, electrical power and data must be delivered to each seat. Conventionally, power and data are delivered to aircraft passenger seats via numerous cables that, during aircraft assembly, are laid out in position on the floor of the aircraft passenger cabin. A portion of the cables is positioned beneath a covering, such as the seat track cover, and a portion that includes connectors to the seats is left exposed to connect with the yet to be installed seat groups containing each passenger seat.

During installation of the seat groups, the seat groups must be carried in over the exposed wires. Taking care to avoid the exposed wires increases both the complexity of the operation and the amount of time required to install the seats. Once the seats are installed, installers must crawl along the floor of the aircraft to manually attach each wire to each seat group. This process is cumbersome and time consuming. Further, in order to change the configuration of the seats or to replace the seats, an installer must again crawl along the floor, disconnect the wiring from each group, and maneuver the seats around the exposed wiring. Still further, in order to change the position of the seat groups, the aircraft must be re-wired so that the wiring will reach the seats in their new positions. As would be expected, re-wiring an aircraft is a costly and time consuming process.

In view of the foregoing, it is desirable to provide an improved device for delivering power to aircraft passenger seat groups that will eliminate the need to separately connect each seat group to an individual power or data cable and the need to re-wire the cables when the seat configuration is changed.

SUMMARY OF THE INVENTION

A power bus device and method operable to distribute power/data to a plurality of seats. In one embodiment, the power bus delivers power/data to any number of select locations within a mobile platform. Power and/or data is transmitted between the power bus and a plurality of passenger seats, via a connector, at any point along the power bus, thus eliminating the need to run separate connections between the power and/or data source and each seat.

In one embodiment, the present invention provides for a system for distributing at least one of data and current to a plurality of seats that are mounted to a seat track at a floor surface. The system comprises a bus mounted beneath the floor surface and extending to each of the seats. The bus is operable to conduct at least one of the data and current along an entire length of the bus. A passenger seat electronic subsystem is provided at the seats for distributing at least one of the data and current at the seats. A connector of the subsystem is operable to conduct at least one of the data and current from the bus to the subsystem through cooperation with the bus at a point below the floor and proximate the seat. The bus is operable to permit cooperation with the connector at substantially any point along a length of the bus.

In another embodiment, the present invention provides for an aircraft passenger cabin system for distributing at least one of data and current throughout a passenger cabin. The system comprises a passenger cabin floor and a seat track extending across the floor. The seat track is mounted on a sub floor that is located beneath the floor. One or more passenger seats are mounted to the seat track at the floor. A bus is mounted to the sub floor between the sub floor and the floor. The bus is operable to conduct at least one of data and current along substantially an entire length of the bus. A passenger seat electronic subsystem is provided at one or more of the passenger seats for communicating at least one of the data and current about the passenger seats. A connector of the subsystem is operable to mate with the bus beneath the floor to conduct at least one of the data and current between the bus and the subsystem.

In still a further embodiment, the present invention provides for a method for distributing at least one of data and current throughout an aircraft passenger cabin. The method includes mounting a seat track to a sub floor between the sub floor and a passenger cabin floor such that a portion of the seat track is exposed at the cabin floor. One or more passenger seats are mounted to the seat track. A bus is mounted to the sub floor at least proximate to the seat track. The bus is operable to conduct at least one of the data and current along substantially an entire length of the bus. One or more passenger seats are mounted to the seat track at the cabin floor. The seats are provided with an electronic subsystem for providing access to at least one of the data and current at the passenger seats, the subsystem includes a connector. The connector is mated with the bus to conduct at least one of the data and current between the bus and the subsystem.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 8B is a cross-sectional view similar to FIG. 8A showing the contacts in a retracted position;

FIG. 13 is a side cross-sectional view of a power bus system according to a further embodiment of the present invention;

DETAILED DESCRIPTION OF THE PREFERRED EMBODIMENTS

The following description of the preferred embodiments is merely exemplary in nature and is in no way intended to limit the invention, its application, or uses.

Figure 1:
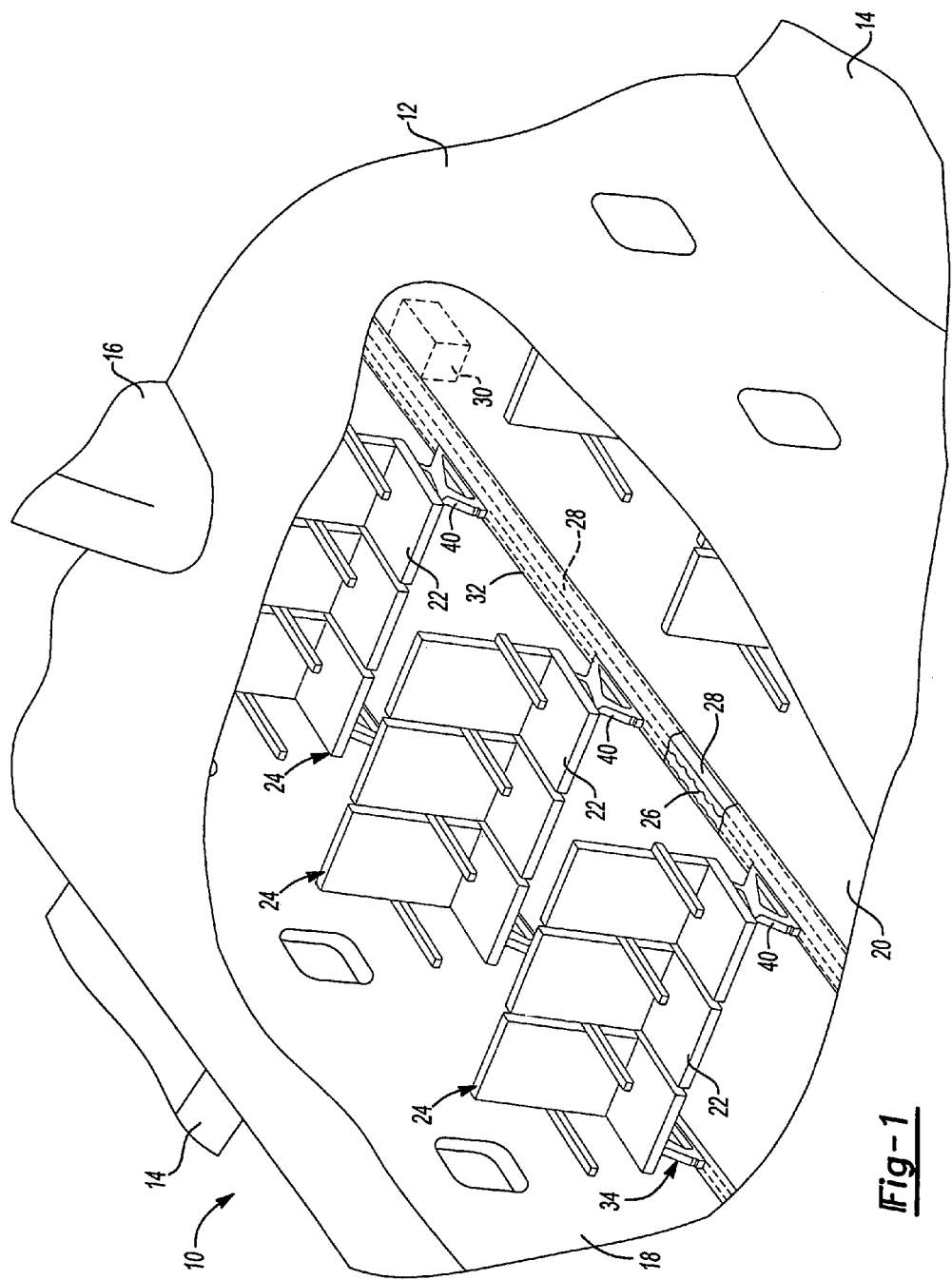
FIG. 1 is a partially cut-away view of an aircraft passenger cabin in accordance with an embodiment of the present invention.

With initial reference to FIG. 1, a passenger aircraft equipped with a power bus system according to one preferred embodiment of the present invention is illustrated at reference numeral 10. It will be appreciated immediately, however, that the present invention can be implemented in virtually any form of mobile platform, such as a ship, train, bus, rotor craft or other airborne vehicle, or even in fixed structures such as theaters, conference rooms, auditoriums, etc., or whenever there is a need to supply power and/or data signals to connection ports or components on a plurality of seats or any other location. For example, the system could be used for overhead lighting and passenger controls in an aircraft passenger cabin.

The aircraft 10 generally includes a fuselage 12, wings 14, and a tail fin 16. The fuselage 12 includes a passenger cabin 18 having a floor 20. At the floor 20 are numerous passenger seats 22. Two or more passenger seats 22 are grouped together as a seat group 24. One or more seat tracks 26 extend along the floor 20 to secure the seat groups 24 at the floor 20. A power bus system 28 for delivering power to the seats 22 extends along side of, within, or closely adjacent to one or more of the seat tracks 26. The power bus system connects to a power source 30. The seat tracks 26 and the power bus system 28 are be covered by a seat track cover 32.

Figure 2:
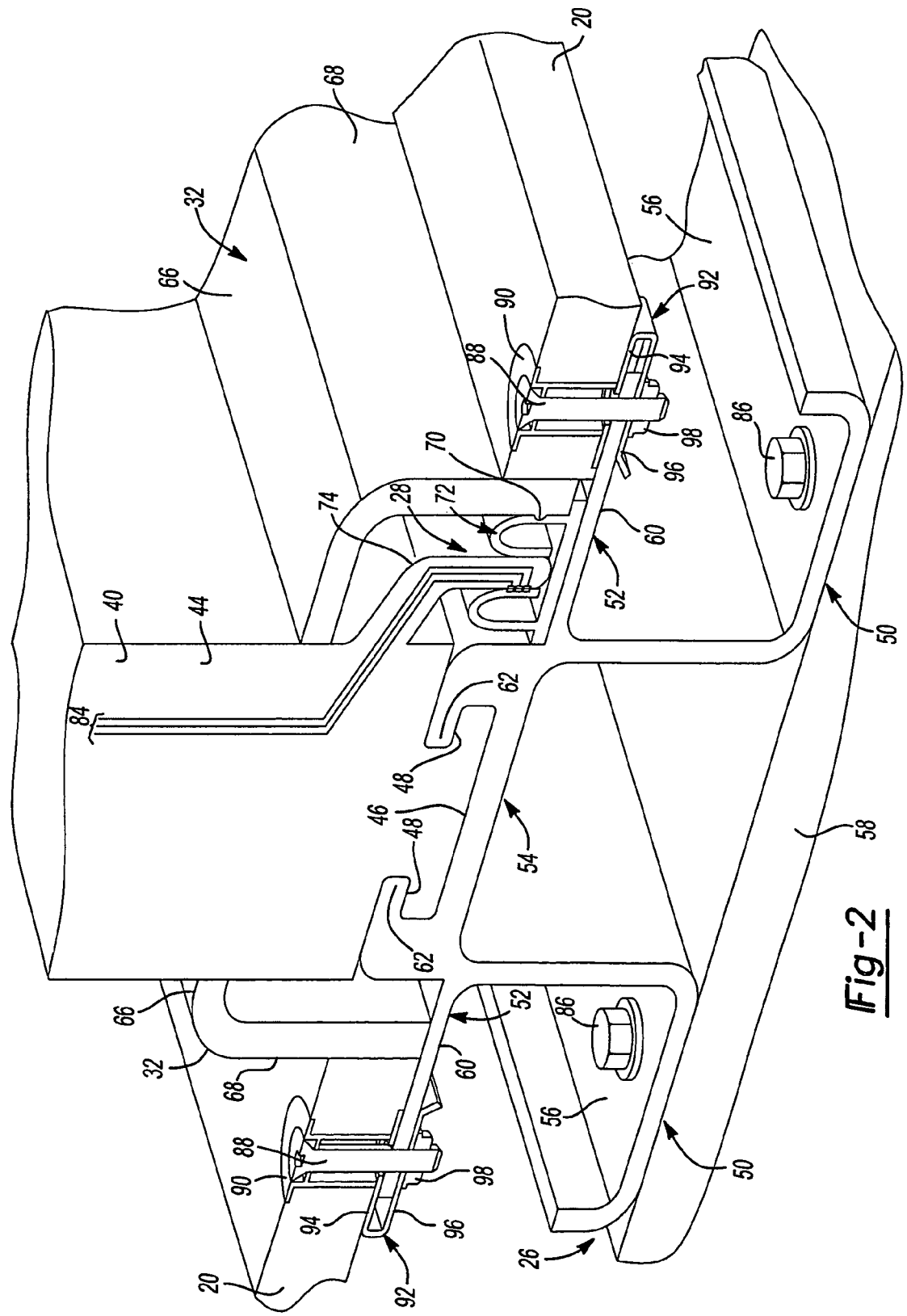
FIG. 2 is a perspective, cross-sectional view of a power bus system according to an embodiment of the present invention.
Figure 5:
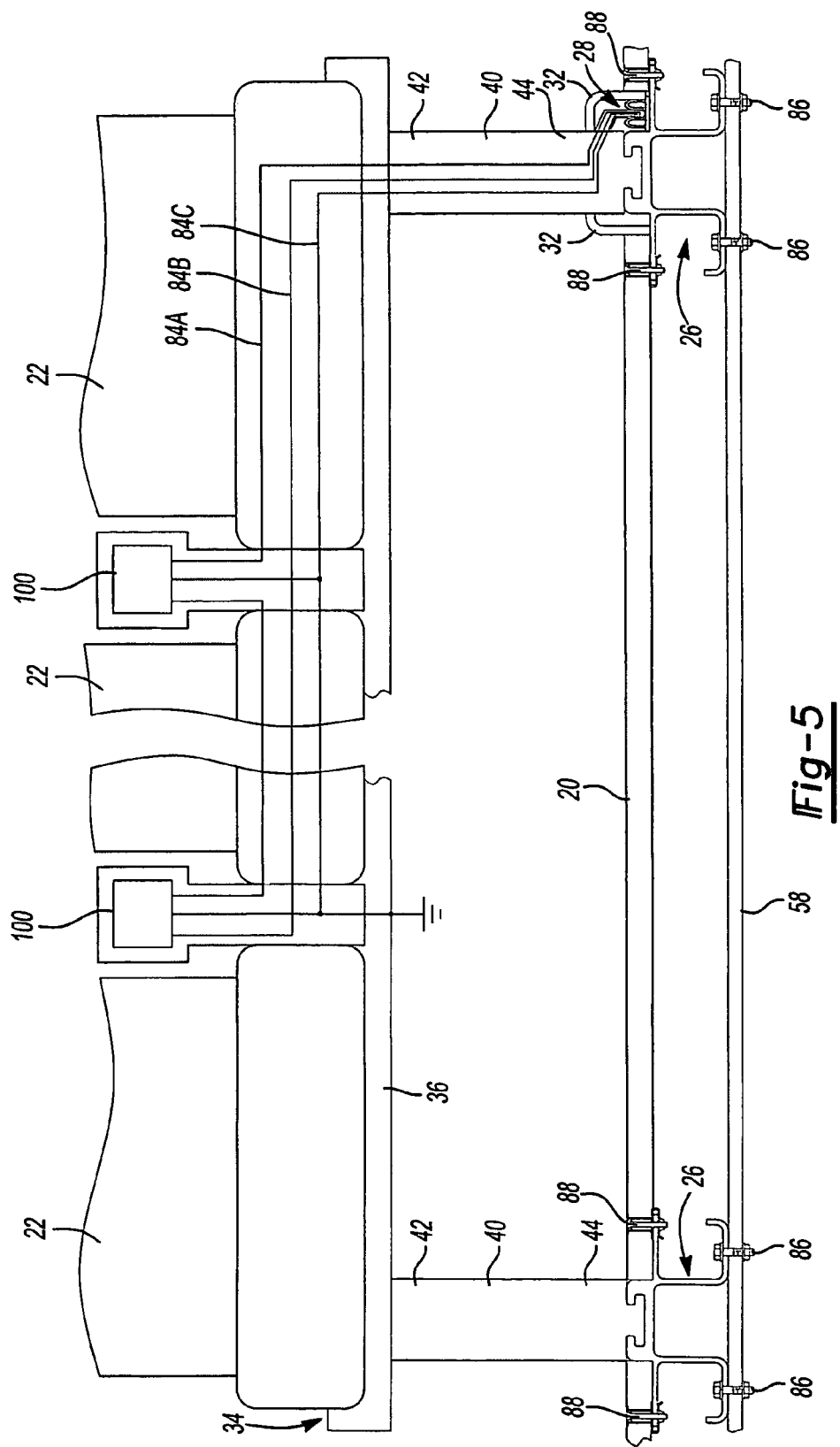
FIG. 5 is a front view of a seat group of FIG. 1 wired in accordance with an embodiment of the present invention.

With continued reference to FIG. 1 and additional reference to FIGS. 2 and 5, each seat group 24 includes a frame 34. The frame 34 includes a base 36 and legs 40. The base 36 provides support to the different passenger seats 22. The legs 40 support the base 36. The legs 40 include an upper portion 42 and a lower portion 44. The upper portion 42 mates with or can be integrated with the base 36. The lower portion 44 includes a fastening surface 46. The fastening surface 46 can be any conventional fastening feature or device capable of securing the seat group 24 to the seat track 26. For example, the fastening surface 46 includes a tab 48 for cooperating with the seat track 26. The tab 48 can be, for example, round, square, or rectangular to be securely received by the seat track 26.

The seat track 26 has a base portion 50, a floor support 52, and a seat engagement portion 54. The base portion 50 includes one or more extensions 56 to support the seat track 26 on a fuselage floor beam 58. The floor support 52 includes one or more protrusions 60 that protrude from the seat engagement portion 54. The protrusions 60 provide support to the floor 20 in the area proximate to the seat track 26. The seat engagement portion 54 includes two arms 62 for cooperating with and securing the legs 40.

The seat track cover 32 is an elongated strip for covering the seat track 26 and the power bus system 28. The seat track cover 32 can be any suitable shape, such as rectangular, to cover the seat track 26. As illustrated in FIG. 2, the seat track cover 32 generally has a planar base portion 66 and two sidewalls 68 extending from the base portion 66. The cover 32 can also have a locking detail 70 to lock the seat track cover 32 in place.

Figure 3:
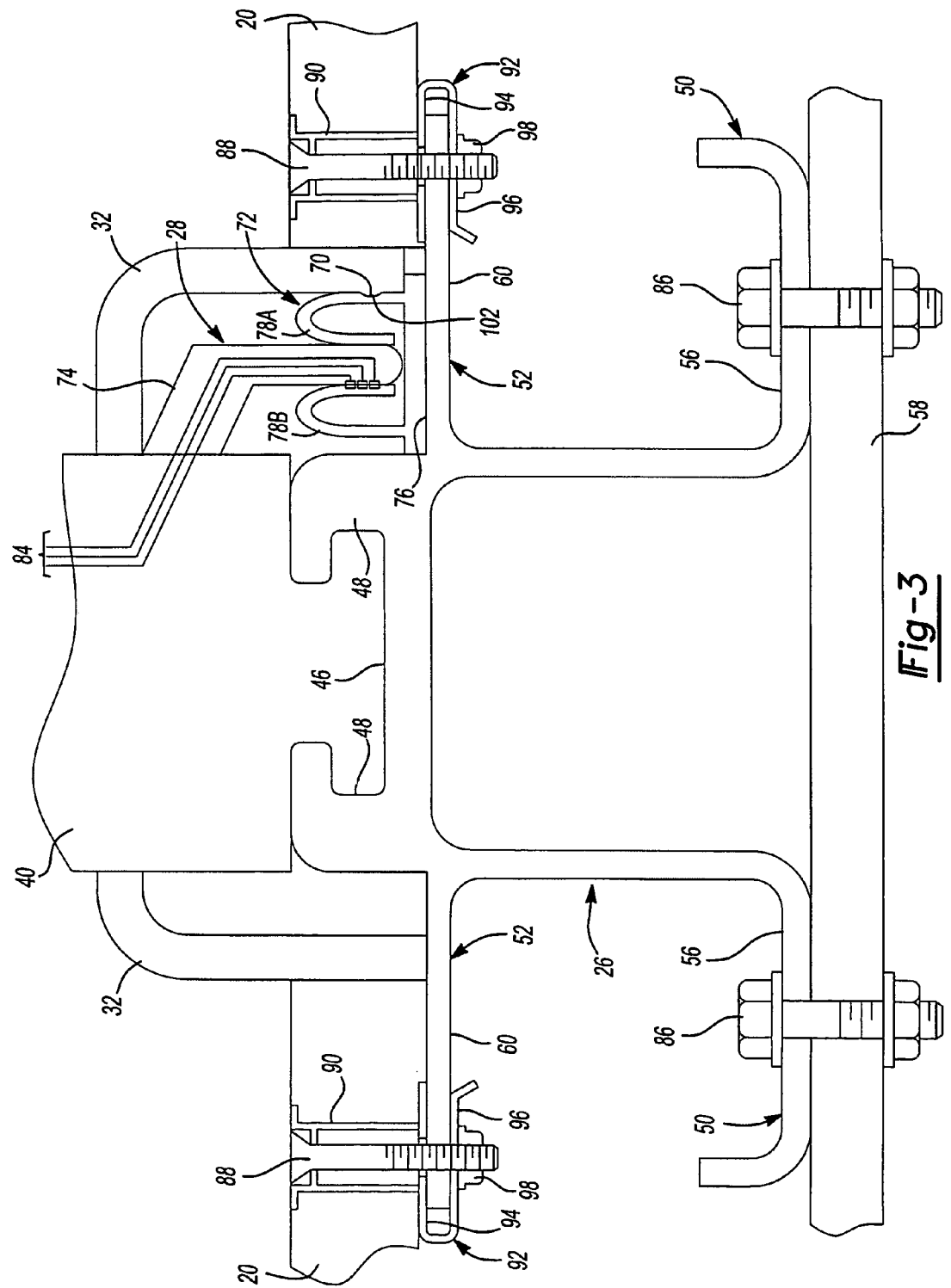
FIG. 3 is a cross-sectional view of the embodiment of FIG. 2.
Figure 4:
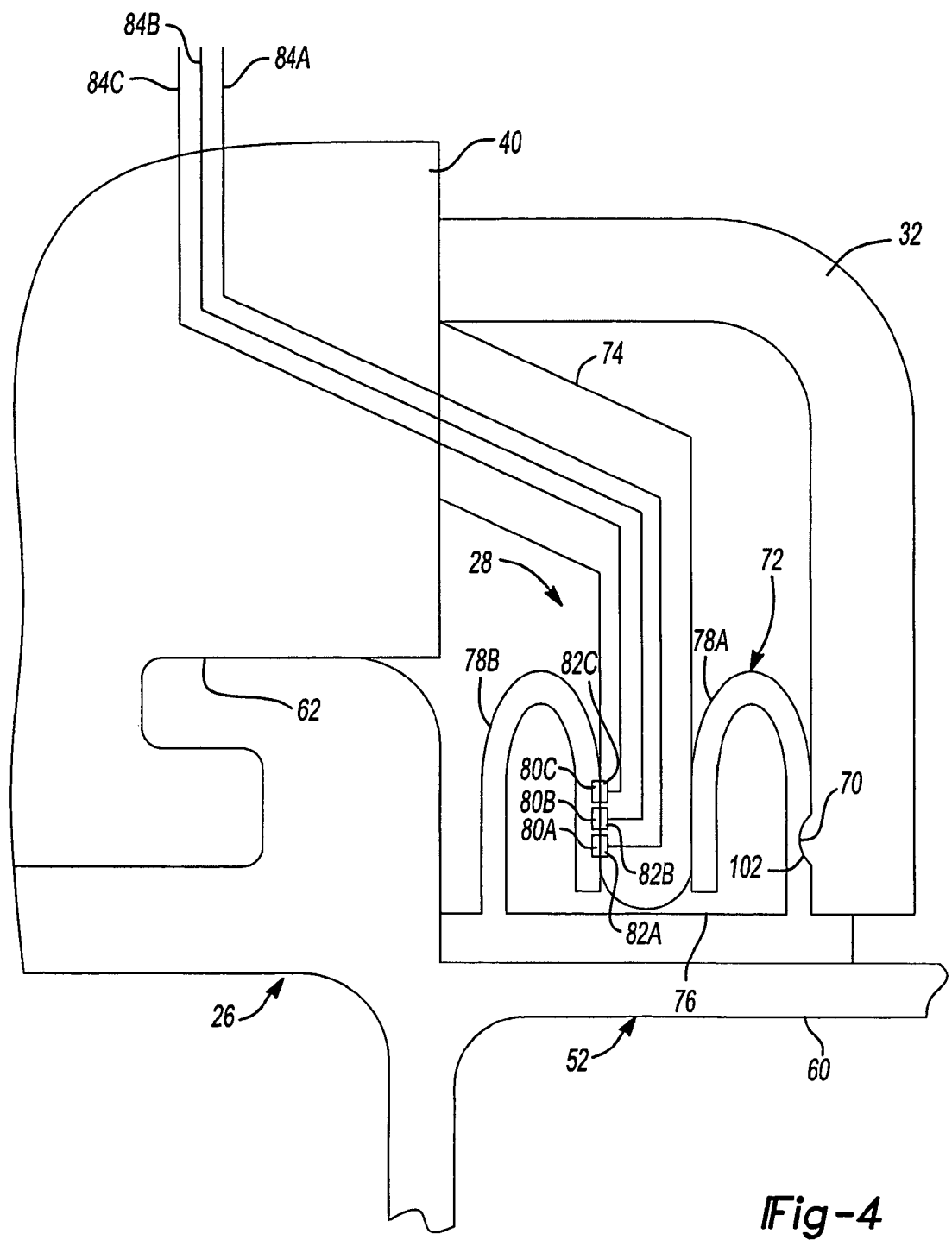
FIG. 4 is a close-in view of the power bus of FIG. 2.

With continued reference to FIGS. 1 and 2 and additional reference to FIGS. 3, 4 and 5, an embodiment of the power bus system 28 is illustrated. The power bus system 28 generally includes a power bus track 72 and a power bus track engagement arm 74. The power bus track 72 can be positioned on the seat track 26 itself, such as on one of the protrusions 60, or along the floor 20 at or near the seat leg 40. The power bus track 72 generally includes a base 76 with two posts 78A and 78B extending from the base 76. The two posts 78 are positioned close together such that a small gap, slightly smaller than the width of the engagement arm 74, is defined between the two posts 78. As best illustrated in FIG. 4, one or both of the posts, such as the post 78B as illustrated, include one or more contacts 80. The contacts 80 can be made of any suitable conductive material, such as copper. In some applications, the post 78B can include three contacts 80A, 80B, and 80C. For example, contact 80A can be used to receive power from the power source 30 to transmit electricity along the length of the power bus track 72, the contact 80B can be used as power return to return power to the power source 30, and the contact 80C can be used as a ground.

The power bus engagement arm 74 can take the form of any suitable support on or adjacent to the seat leg 40 for one of more contacts 82. As illustrated, the arm 74 includes three contacts 82A, 82B, and 82C. The contacts 82 can be made of any suitable material, such as copper. The contacts 82 mate with conductive lines or wires 84 that extend through the arm 74 to carry power to the passenger seats 22 or in-flight entertainment systems. As illustrated, three wires 84A, 84B, and 84C are included to mate with each of the contacts 82A, 82B, and 82C respectively. Thus, in some applications the wire 84A is used as a power supply, the wire 84B is used as a power return, and the wire 84C is used as a ground.

The cooperation of the above components and their operation will now be described in detail. The seat tracks are generally positioned just beneath or at the surface of the floor 20 and generally extend the length of the passenger cabin 18. Portions of the floor 20 are removed just above the seat tracks 26 to permit access to the seat tracks 26 from the passenger cabin 18. The aircraft 10 can include virtually any number of seat tracks 26 depending on the application. In some applications, two seat tracks 26 are provided to support each seat group 24 at the floor 20.

The seat tracks 26 are held in position by securing the extensions 56 to the floor beam 58 of the fuselage 12. The extensions 56 are secured to the floor beam 58 in any suitable manner, such as using an adhesive or a fastener, such as a bolt 86 extending through the extensions 56, at numerous positions along the length of the seat track 26. With the seat track 26 secured into position below the floor 20, the floor support 52 is used to provide support to the portions of the floor 20 proximate to the seat track 26.

To further secure the seat tracks 26 into position, additional fasteners are used along the length of the seat track 26, such as a flush mounted screw 88, to secure the protrusions 60 of the floor support 52 to the floor 20. Specifically, an insert 90 is positioned within the floor 20 to receive the flush mounted screw 88, which further extends through the protrusions 60. A clip-nut 92 is used to secure the flush mounted screw 88 to the protrusions 60. The clip-nut 92 includes a top portion 94 and a bottom portion 96. The top portion 94 includes an aperture for receiving the flush mounted screw 88 and the bottom portion 96 includes a conventional lock-nut 98 held captive within the bottom portion 96. The clip-nut 92 wraps around the protrusion 60 such that the top portion 94 is at an upper surface of the protrusion 60 and the bottom portion 96 is at the lower surface of the protrusion 60. To secure the protrusion 60 to the floor 20, the flush mounted screw 88 is inserted through the insert 90, through the top portion 94 of the clip nut 92, through the protrusion 60, and through the bottom portion 96 of the clip nut 92 where it cooperates with the lock-nut 98 to hold the flush mounted screw 88 into position to fasten the floor 20 to the protrusions 60 of the seat track 26.

With the seat tracks 26 secured in position, the seat groups 24 containing the passenger seats 22 are installed. The seat groups 24 are positioned above the seat tracks 26 such that the legs 40 of each seat group are aligned with the seat tracks 26. Generally, the fastening tab 48 of the seat legs 40 is, at its widest point, wider than the distance between the arms 62 of the seat engagement portion 54 of the seat track 26. However, at various points along the length of the seat track 26, the distance between the arms 62 increases to permit passage of the tab 48. It is at these regions that the fastening tab 48 is inserted past the arms 62 to within the seat engagement portion 54. The seat group 24 is then moved along the seat track 26 such that the tab 48 is positioned at a point in the seat track where the distance between the arms 62 is less than the width of the tab 48 to lock the tab 48, and thus the seat group 24, to the seat track 26. To insure that the tab 48 does not return to the area of the seat track 26 where the. distance between the arms 62 is widened, the seat leg 40 is secured into position along the seat track 26 in any conventional manner, such as by a bolt.

As the seat leg 40 is inserted within the seat track 26, the engagement arm 74 is inserted between the two posts 78A and 78B. Because the distance between the two posts 78A and 78B is slightly narrower than the width of the arm 74, the arm 74 slightly spreads the two posts 78A and 78B to make secure contact with the power bus track 72. Further, the contacts 82 of the engagement arm 74 also make secure contact with the contacts 80 of the power bus track 72.

Electricity is supplied to the contacts 80 by the power source 30. The power source 30 can be a dedicated battery for supplying power to the passenger seats 22 or can be the aircraft's general power source. The power source 30 can include electrical contacts (not shown) that make an electrical connection with the contacts 80 to energize the contacts 80 and the power bus track 72.

With particular reference to FIG. 5, electricity transferred from the power bus track 72 to the contacts 82 of the arm 74 is carried up along the seat frame to the passenger seats 22 by one or more of the conductive wires 84, where the power can be accessed by a passenger via a power outlet 100 or an in-flight entertainment system. The number of wires 84 and their use can vary depending upon the application. As illustrated, the wire 84A is used to supply electricity to the seats 22, the wire 84B is used as a return to carry electricity back from the seats 22, and the wire 84C is used as a ground. The ground wire 84C can be grounded at the seat frame 34.

With the seat leg 40 in place and the engagement arm 74 seated within the power bus track 72, the seat track cover 32 is placed over the seat track 26 and the power bus system 28. For example, the cover 32 is positioned such that sidewalls 68 are seated beneath the floor 20 and the base 66 is approximately level with the upper surface of the floor 20. To help secure the cover 32 into position, the locking detail 70 cooperates with a recess 102 of a corresponding size and shape in the engagement arm 74. To permit passage of the legs 40 through the cover 32, portions of the base 66 may be removed in the regions of the legs 40. Further, if the engagement part 74 is secured to the legs 40 above the base 66, a portion of the base 66 is removed to accommodate the engagement arm 74 also. Alternatively, the cover 32 may be cut to length to fit between adjacent seat groups 24.

The power bus 28 can include numerous features in addition to those described above. For example, the base 76 of the track 72 can include a spring to bias the track 72 in the direction of the arm 74 to enhance the connection between the track 72 and the arm 74. Further, the power bus track 72 can be rotated clockwise approximately 90 degrees from its orientation in FIG. 2 and the arm 74 can be configured to engage the track 72 horizontally rather than vertically as illustrated. Still further, the arm 74 can include a joint to allow it to pivot or slide in and out of cooperation with the track 72, such that the arm 74 can engage or disengage the track 72 even while the leg 40 is locked to the seat track 26. This feature permits the seat track 72 to be removed and serviced even while the leg 40 is locked in position.

Figure 6:
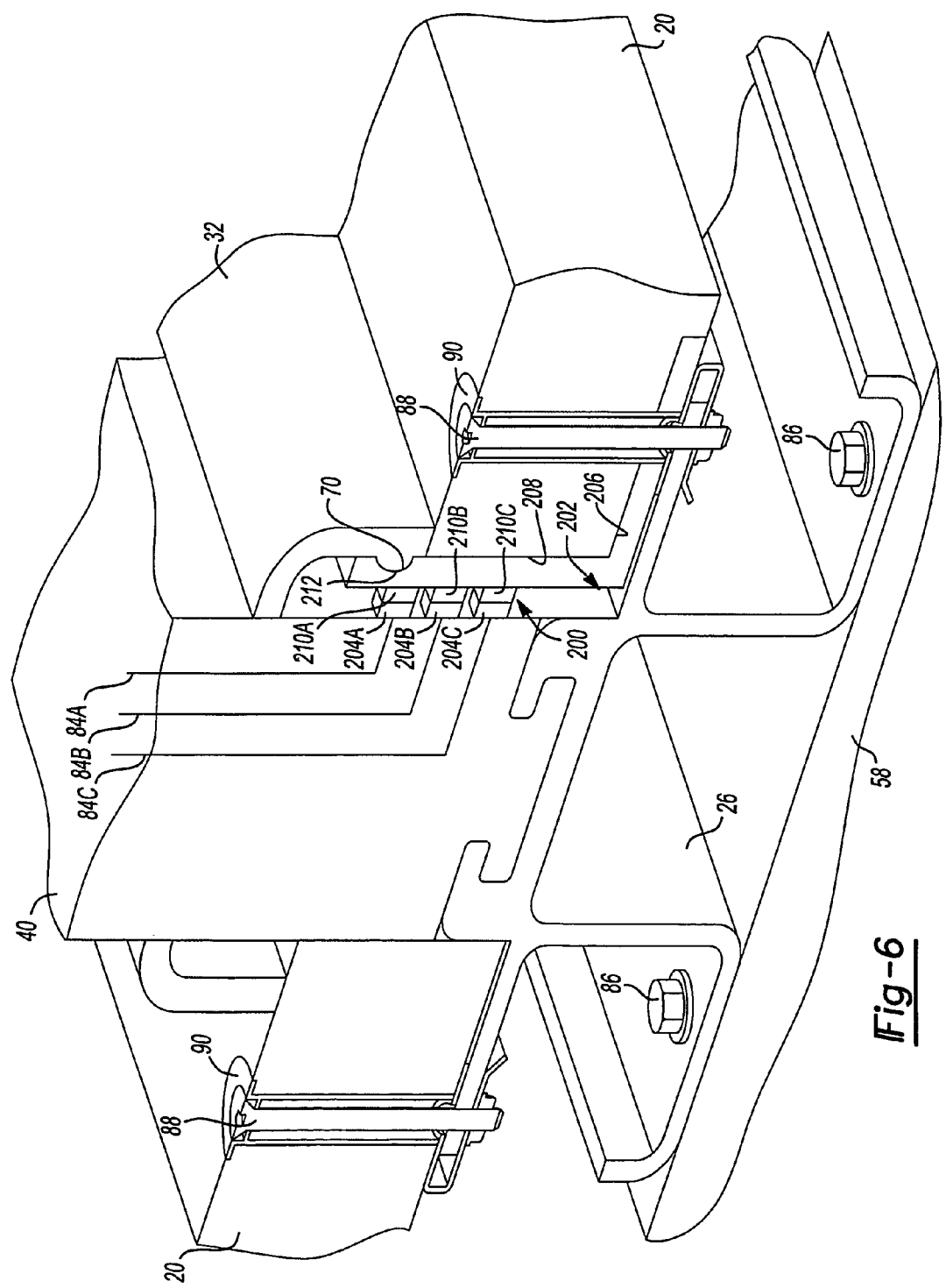
FIG. 6 is a perspective, cross-sectional view of a power bus system according to an additional embodiment of the present invention.

FIG. 6 illustrates an additional embodiment of the power bus system of the present invention at reference numeral 200. Because many of the components of the embodiment of FIG. 6 are substantially similar to those of FIGS. 2 through 5, like reference numbers are used to identify the similar components and the above detailed description sufficiently describes these components. The power bus system 200 operates in a manner similar to the power bus system 28 and, therefore, the above description concerning the operation of power bus system 28 also equally applies to power bus system 200.

The power bus system 200 generally includes a power bus bracket 202 that extends across at least a portion of the passenger cabin 18 and contacts 204 located at the seat leg 40 opposite the bracket 202. The power bus bracket 202 is generally "L" shaped and includes a horizontal portion 206 and a vertical portion 208. The horizontal portion 206 is positioned between the protrusion 60 and the undersurface of the floor 20. The vertical portion 208 extends from the horizontal portion 206 at approximately a right angle and is positioned between the seat leg 40 and the floor 20. The vertical portion 208 includes contacts 210 and a locking detail 212. The bracket 202 is secured into position by the flush-mounted screw 88 that extends through the horizontal portion. The bracket 202 is positioned such that the contacts 210 and the contacts 204 are in electrical contact with each other. The contacts can be made of any suitable conductive material, such as copper. The cover 32 is secured over the power bus 200 and the seat track 26 through cooperation between the detail 70 of the cover 32 and the detail 212 of the power bus bracket 202.

The contact 210A cooperates with the power source 30, the contact 210B serves as a power return to the power source 30, and the contact 210C is a ground. Therefore, the cooperation between the contact 210A and the contact 204A provides power to the seat group 24 via the wire 84A, cooperation between the contact 210B and the contact 204B receives power from the wire 84B to act as a power return, and finally the contact 210C, the contact 204C, and the wire 84C are in cooperation to ground the seat group 24.

Figure 7:
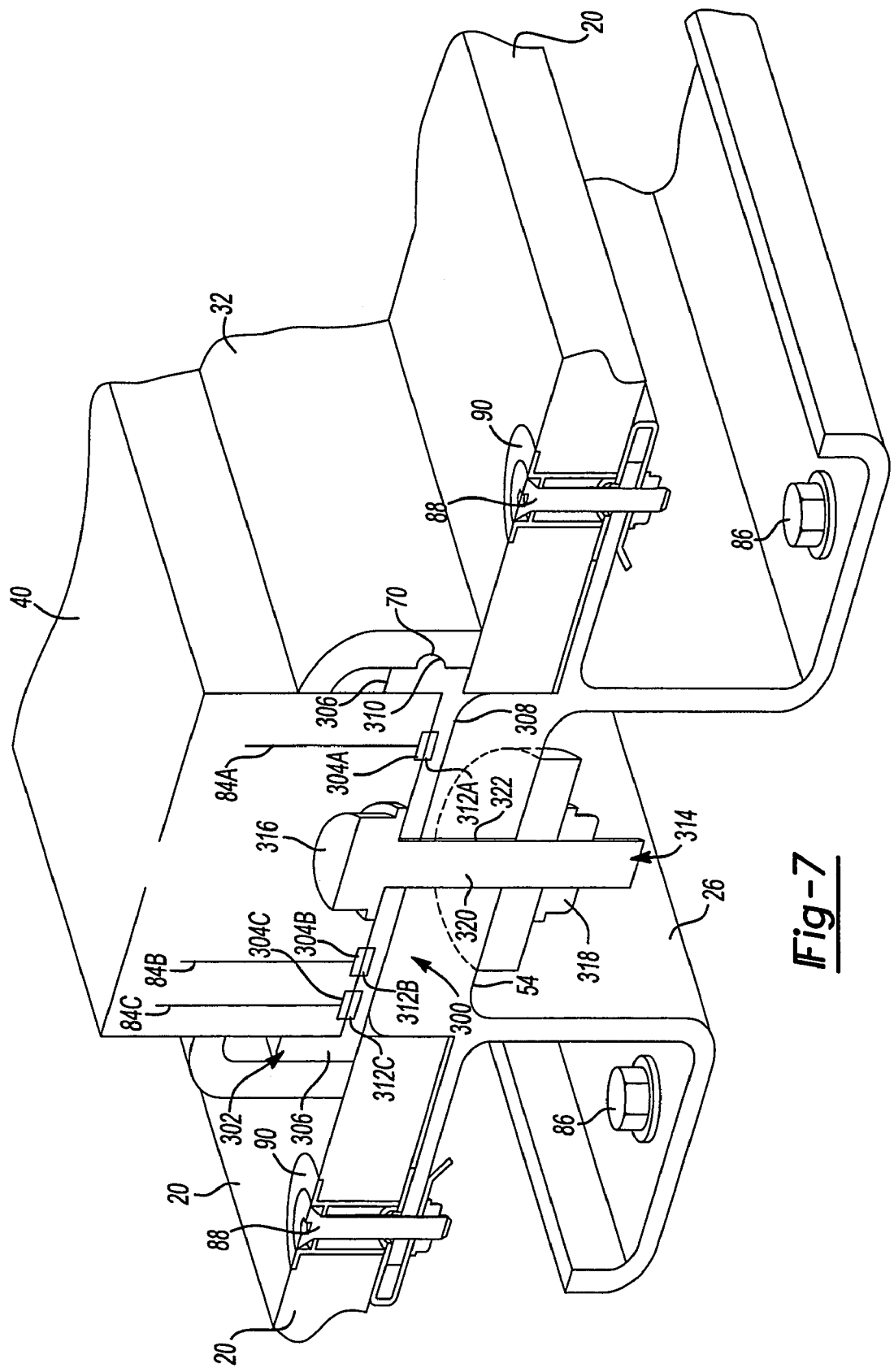
FIG. 7 is a perspective cross-sectional view of a power bus system according to yet another embodiment of the present invention.

FIG. 7 illustrates an additional embodiment of the power bus system of the present invention at reference numeral 300. Because many of the components of the embodiment of FIG. 7 are substantially similar to those of FIGS. 2 through 5, like reference numbers are used to identify the similar components and the above detailed description sufficiently describes these components. The power bus system 300 operates in a manner similar to the power bus system 28 and, therefore, the above description concerning the operation of power bus system 28 also equally applies to power bus system 300.

The power bus system 300 generally includes a power bus base track 302 and one or more contacts 304 at an undersurface of the seat leg 40. As illustrated, three contacts 304A, 304B, and 304C cooperate with the wires 84A, 84B, and 84C respectively. The base track 302 generally includes sidewalls 306 and a base 308. The side walls 306 include a locking detail 310 that cooperates with the locking detail 70 of the cover 32 to secure the cover 32 at the power bus system 300. The base 308 includes one or more contacts 312 operable to mate with the contacts 304. As illustrated, the base includes a first contact 312A that draws power from the power supply 30, a second contact 312B that returns power to the power supply 30, and a third contact 312C that acts as a ground.

The base track 302 can be secured above the floor 20, as illustrated in FIG. 7, or below the floor 20. The base track 302 and the seat leg 40 are secured into position using a suitable fastening device, such as an expandable bolt 314. The bolt 314 includes a first head 316, a second head 318, and a body 320 between the two heads 316 and 318. The second head 318 expands from a retracted position in which the second head 318 is approximately the same diameter as the body 320 to an extended position in which the diameter of the second head 318 is substantially larger than the body 320.

During installation of the power bus system 300, the seat leg 40 is positioned on the base 308 of the base track 302 such that the contacts 304 mate with the contacts 312. Therefore, power is supplied to the wire 84A via the cooperation between the contacts 312A and 304A, power is returned to the power supply 30 via the cooperation between the contacts 312B and 304B, and cooperation between the contacts 312C and 304C grounds the seat group 24 through the wire 84C.

To secure the seat leg 40 to the base track 302 and to secure the base track 302 to the floor 20, the bolt 314, with the second head 318 in the retracted position, is inserted through an aperture of the base of the leg 40 and through an aperture within the base 308 of the base track 302. The body 320 extends through the floor 20 and through the seat engagement portion 54 of the seat track 26, which is configured to include an aperture 322. With the second head 318 positioned on the side of the aperture 322 opposite the floor 20, the second head 318 is expanded to lock the base track 302 and the leg 40 to the seat track 26 and at the floor 20. Finally, the cover 32 is placed over the power bus system 300 and secured in position through cooperation between the details 70 of the cover 32 and the details 310 of the base track 302.

Figure 8:
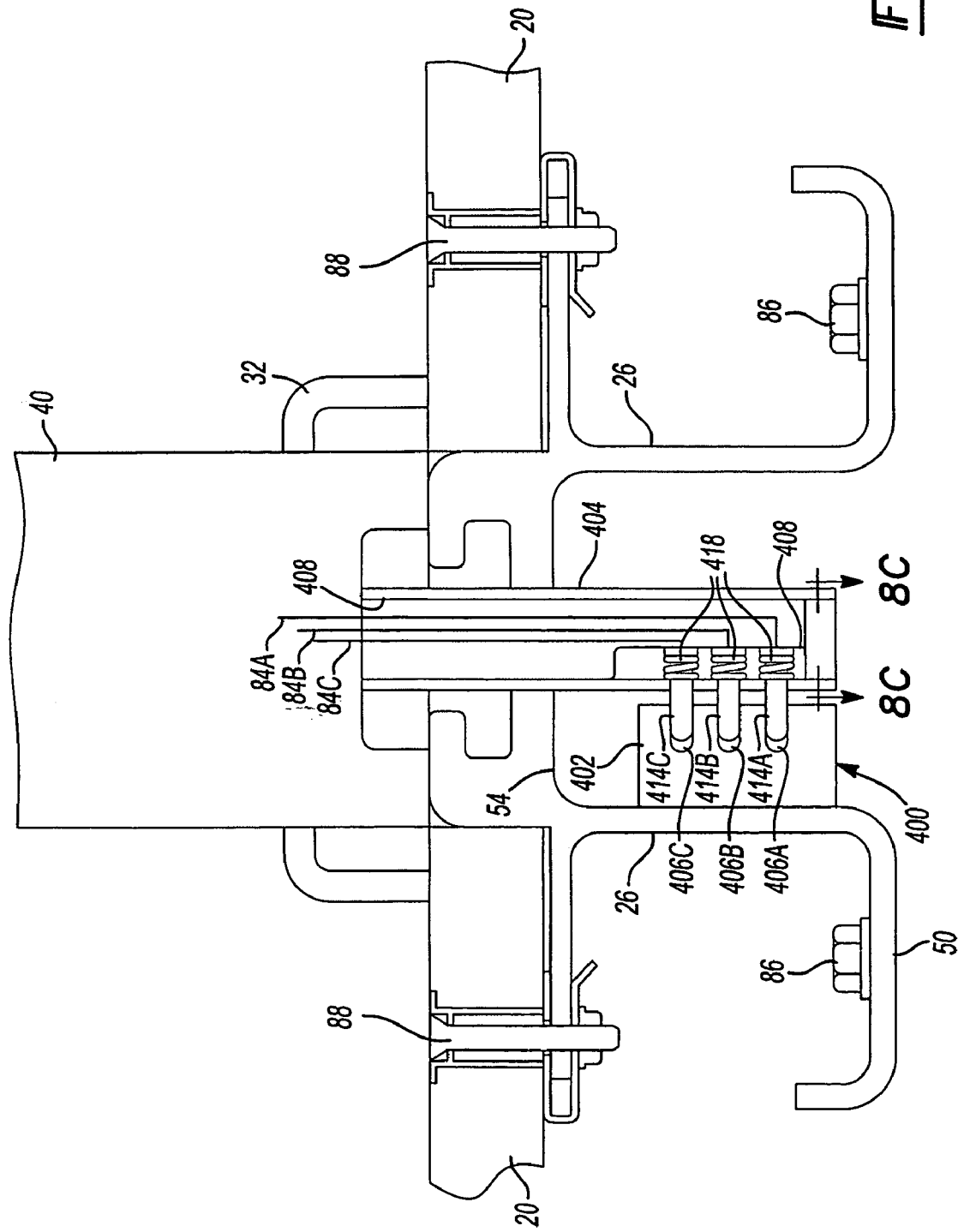
FIG. 8 is a side, cross-sectional view of a power bus system according to a further embodiment of the present invention.

FIG. 8 illustrates an additional embodiment of the power bus system of the present invention at reference numeral 400. Because many of the components of the embodiment of FIG. 8 are substantially similar to those of FIGS. 2 through 5, like reference numbers are used to identify the similar components and the above detailed description sufficiently describes these components. The power bus system 400 operates in a manner similar to the power bus system 28 and, therefore, the above description concerning the operation of power bus system 28 also equally applies to power bus system 400.

The power bus system 400 generally includes a power bus strip 402 and a probe 404. The power bus strip 402 is an elongated strip that extends the length of one or more portions of the passenger cabin 18. The strip 402 includes one or more contacts 406. As illustrated in FIG. 8, the strip 402 includes a first contact 406A that draws power from the power source 30, a second contact 406B that returns power to the power source 30, and a third contact 406C that acts as a ground. The contacts 406 include any suitable conductor, such as copper. The strip 402 is mounted to the seat track 26, such as at a point between the base portion 50 and the seat engagement portion 54.

Figure 8A:
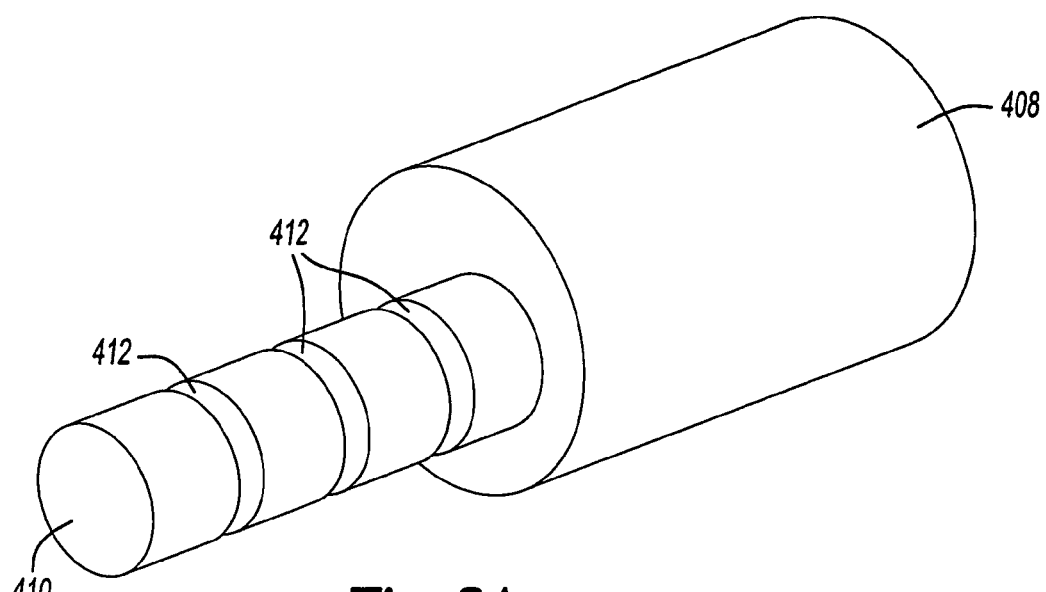
FIG. 8A is a perspective view of a barrel and cam pin component of the system of FIG. 8.
Figure 8B:
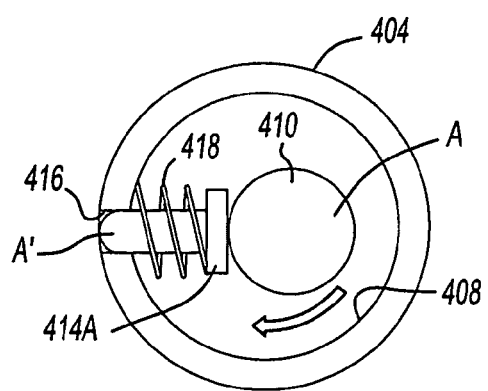
FIG. 8B is a bottom view of the probe of FIG. 8.
Figure 8C:
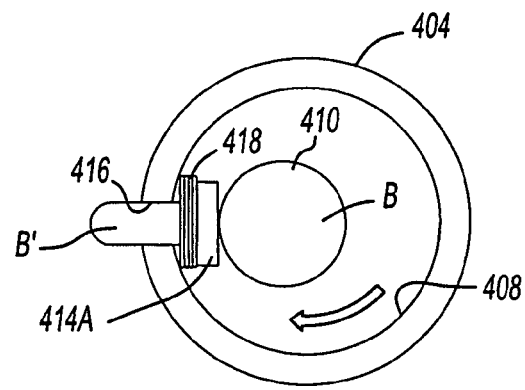
FIG. 8C is a cross-sectional view taken along line 8C-8C of FIG. 8.

With additional reference to FIGS. 8A, 8B, and 8C, the probe 404 houses a barrel 408 in any manner suitable to permit rotation of the barrel 408 within the probe 404. A cam pin 410 extends from the barrel 408 and has a smaller diameter than the barrel 408. The cam pin 410 is offset from the longitudinal axis of the barrel 408 such that rotation of the barrel 408 about its longitudinal axis will not only rotate the cam pin 410, but will also cause the pin 410 to shift laterally between a first position A (FIG. 8B) and a second position B (FIG. 8C).

The cam pin 410 includes one or more contact disks 412. The contact disks 412 are conductive disks operable to conduct current between a current source and the contacts 406 by way of conductive terminal 414. A terminal 414 is in contact with each disk 412. The terminals 414 are mounted in an opening 416 of the probe 404. The terminals 414 are movable between a first position A' (FIG. 8B) in which the terminals 414 are retracted within the probe 404 and a second position B' (FIG. 8C) in which the terminals 414 extend from the probe 404.

The terminals 414 are biased in the first position A' by a spring 418. Rotation of the barrel 408 effectuates rotation and movement of the pin 410 from position A of FIG. 8B to position B of FIG. 8C. Movement of the pin 410 from position A to position B causes the pin 410 to push the terminals 414 to position B' and out of the probe 410 and into contact with the contacts 406 to permit the transfer of signals between the probe 404 and the bus 402. The barrel 408 can be rotated in any suitable manner, such as using a tool that cooperates with a surface of the barrel 408 and allows for engagement and rotation of the barrel 408 with the tool.

During installation to the probe 404 the pin is at position A so that the terminals are recessed within the probe 404 and the probe can be installed near the bus 402. After the probe 404 is installed the barrel 408 is rotated to move the pin 410 to position B so that the terminals 414 are moved out from within the probe 404 by the cam pin 410. To remove the probe the pin 410 is moved backed to position A and the terminals 414 are retracted to position A'.

Figure 9:
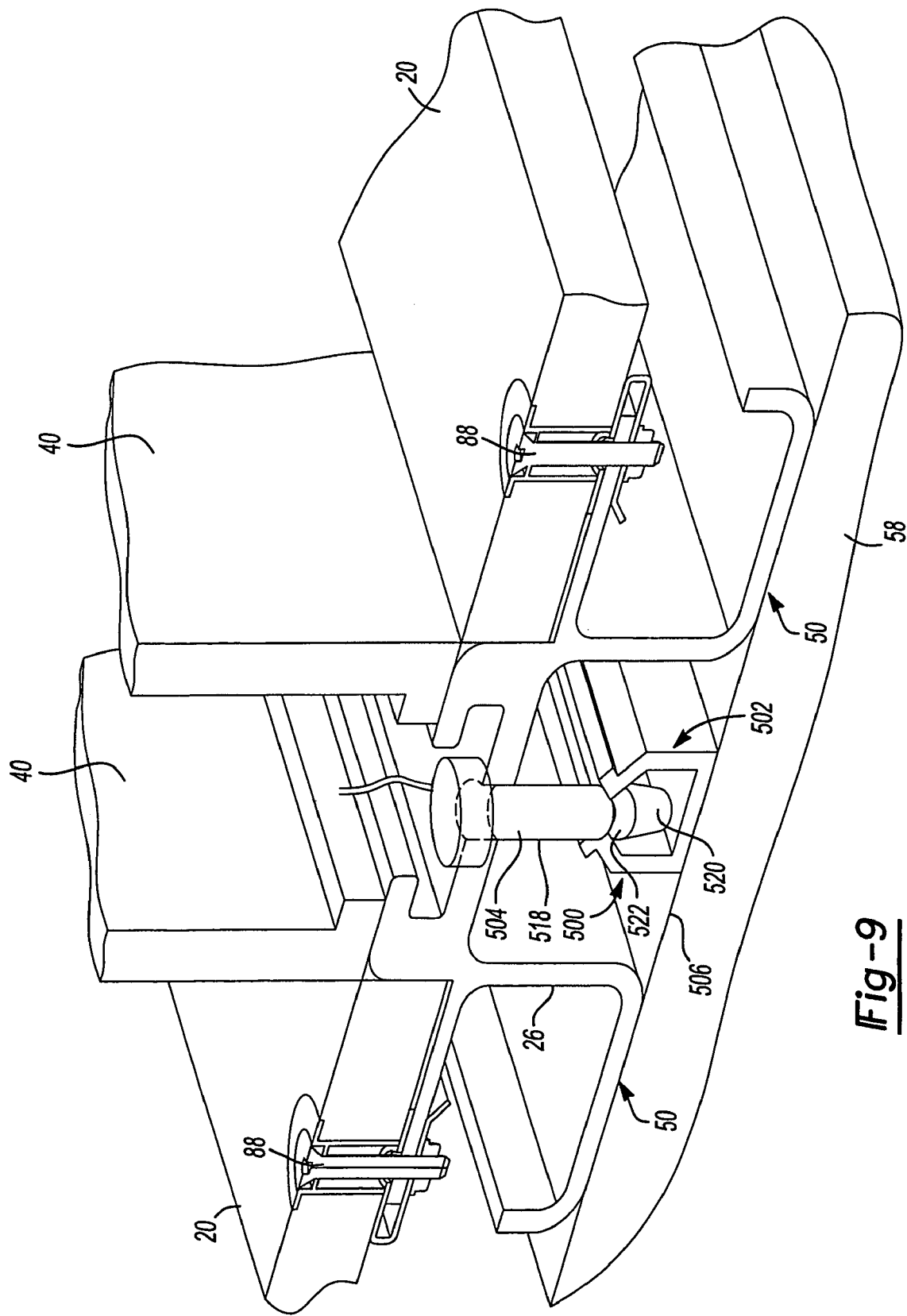
FIG. 9 is a perspective cross-sectional view of a power bus system of the present invention according to yet a further embodiment.
Figure 10:
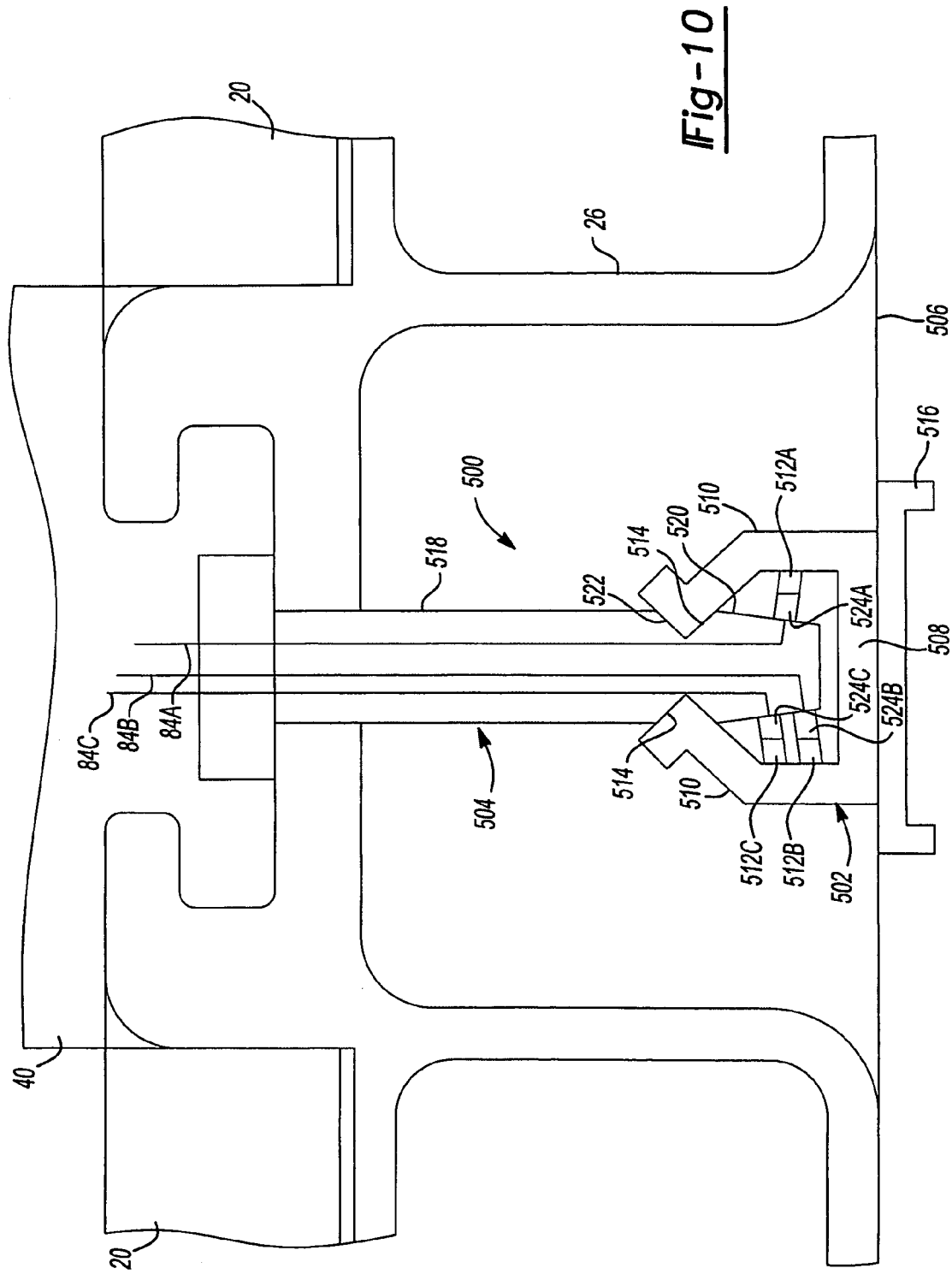
FIG. 10 is a close-in view of the power bus system of FIG. 9.

FIGS. 9 and 10 illustrate an additional embodiment of the power bus system of the present invention at reference numeral 500. Because many of the components of the embodiment of FIGS. 9 and 10 are substantially similar to those of FIGS. 2 through 5, like reference numbers are used to identify the similar components and the above detailed description sufficiently describes these components. The power bus system 500 also operates in a manner similar to the power bus system 28 and, therefore, the above description detailing the operation of power bus system 28 equally applies to power bus system 500.

The power bus system 500 generally includes a power bus strip 502 and a power bus strip engagement component forming, in one preferred form, a plug 504. The power bus strip 502 is an elongated strip that extends the length of one or more portions of the passenger cabin 18. The strip 502 is seated at the base portion 50 of the seat track 26. In this embodiment, the seat tract 26 includes a center base portion 506 upon which the power bus strip 502 is mounted in any suitable manner, such as using an adhesive or a mechanical fastening device. As illustrated in FIG. 10, the power bus strip 502 includes a bottom portion 508 and two side walls 510. The side walls 510 include one or more contacts 512. The strip 502 includes a first contact 512A, a second contact 512B, and a third contact 512C. The contacts 512 include any suitable conductor, such as copper. The side walls 510 include locking details 514. A spring 516 can be located near the power bus strip 502 and the base portion 506 to bias the power bus strip 502 in an extended position in which it extends from the base portion 506.

The plug 504 generally includes a body 518 and a head 520. The body 518 has locking details 522 shaped to cooperate with the locking details 514. The head 520 has at least one contact 524 made of a suitable conductor, such as copper. For example, the head 520 has a first contact 524A, a second contact 524B, and a third contact 524C. Extending from the contacts 524A, 524B, and 524C are the wires 84A, 84B, and 84C respectively, which extend to the seats 24. When in its operative position, the body 518 of the plug 504 extends through the fastening surface 46 of the seat leg 40 and through the seat engagement portion 54 of the seat track 26 such that the locking details 522 cooperate with the locking details 514 to secure the plug within the power bus strip 502 and to secure the contacts 524 of the head 520 at the contacts 512 of the power bus strip 502. Specifically, the contacts 524A, 524B, and 524C are positioned in electrical contact with the contacts 512A, 512B, and 512C of the power bus strip 502 respectively.

Similar to the contacts 82 of the power bus track 72, the first contact 512A is in electrical contact with the power source 30 to act as a power supply, the second contact 512B serves as a power return, and the third contact 512C serves as a ground. Thus, because the contacts 524A, 524B, and 524C are in contact with the contacts 512A, 512B, and 512C respectively, the wire 84A supplies power, the wire 84B acts as a power return, and the wire 84C serves as a ground.

Figure 11:
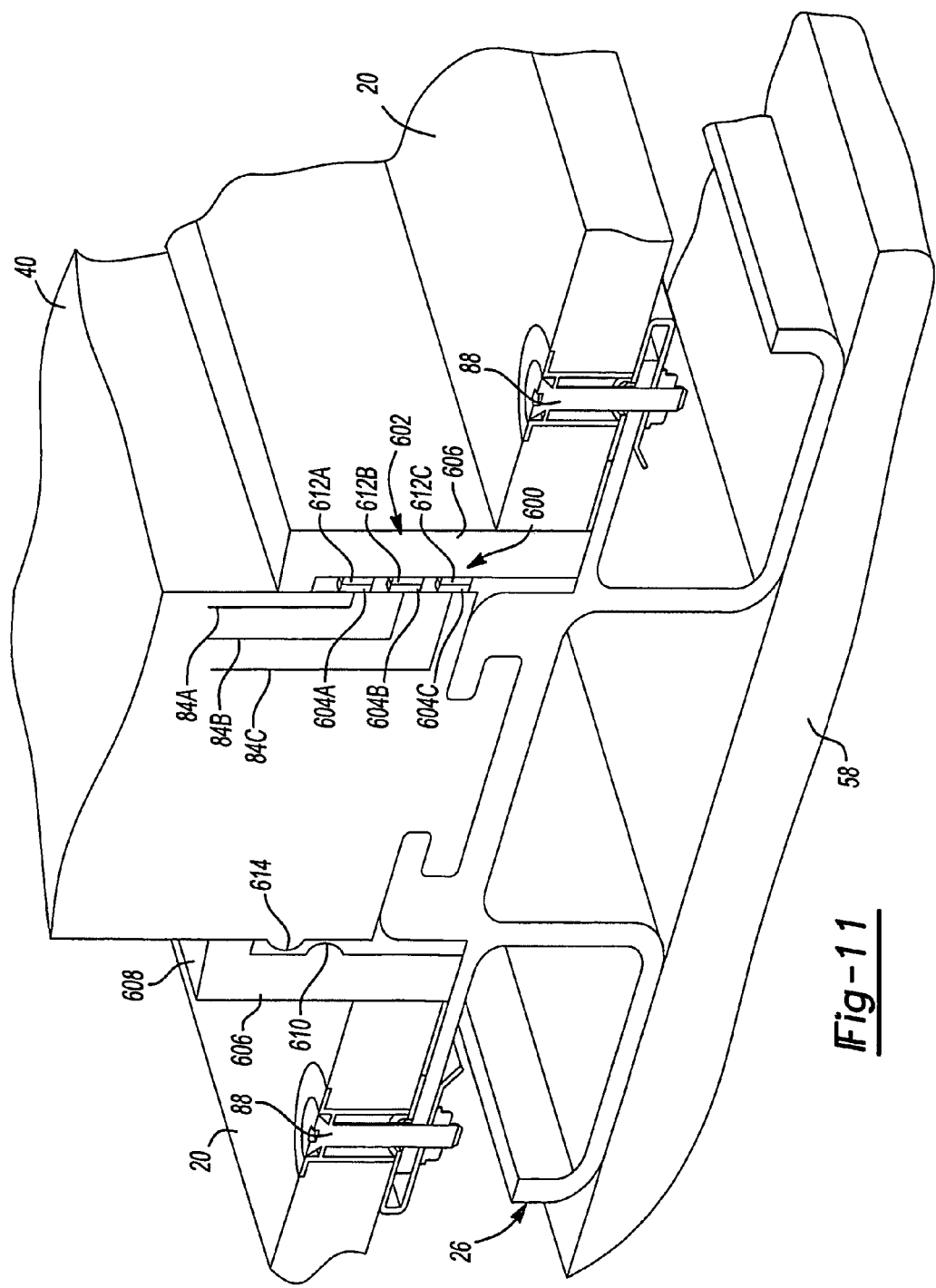
FIG. 11 is a perspective cross-sectional view of a power bus system according to yet an additional embodiment of the present invention.

FIG. 11 illustrates an additional embodiment of the power bus system of the present invention at reference numeral 600. Because many of the components of the embodiment of FIG. 11 are substantially similar to those of FIGS. 2 through 5, like reference numbers are used to identify the similar components and the above detailed description sufficiently describes these components. The power bus system 600 also operates in a manner similar to the power bus system 28 and, therefore, the above description detailing the operation of power bus system 28 equally applies to power bus system 600.

The power bus system 600 generally includes a seat track cover power bus 602 and at least one contact 604 located on a side of the seat leg 40. As illustrated three contacts 604A, 604B, and 604C are provided at the leg 40, with each contact 604 connecting to the wire 84A, 84B, and 84C respectively. The seat track power bus 602 extends across a portion of the passenger cabin 18 over the seat track 26. The seat track power bus 602 generally includes two side walls 606 that each extend from a cover portion 608. The side walls 606 include locking details 610 on an inner surface thereof. Further, the side walls 606 include one or more contacts 612. As illustrated, the power bus 602 includes a first contact 612A that receives a power input from the power source 30, a second contact 612B that acts as a power return to the power source 30, and a third contact 612C that grounds the power bus system 600. The contacts 612 can be made of any suitable conductive material such as copper.

During assembly of the power bus system 600, the cover portion 608 is inserted over the seat track 26 such that the sidewalls 606 are supported by the floor support 52 and positioned within the floor 20. In the area of the seat legs 40, portions of the cover portion 608 are removed to permit the seat leg 40 to pass through the cover portion 608. The power bus 602 is inserted such that the locking details 610 pass over similar locking details 614 of the seat leg 40 to lock the power bus 602 over the seat track 26. The power bus 602 is positioned such that the contacts 612A, 612B, 612C are in electrical contact with the contacts 604A, 604B, and 604C respectively. Thus, in operation, the contact 612A supplies power to the seat group 24 via the contact 604A and the wire 84A; power is returned to the power source 30 via the wire 84B, the contact 604B, and the contact 612B; and the power bus system 600 is grounded by the wire 84C, the contact 604C, and the contact 612C, which is grounded to a suitable ground surface using a conventional connector.

Figures 12, 12A:
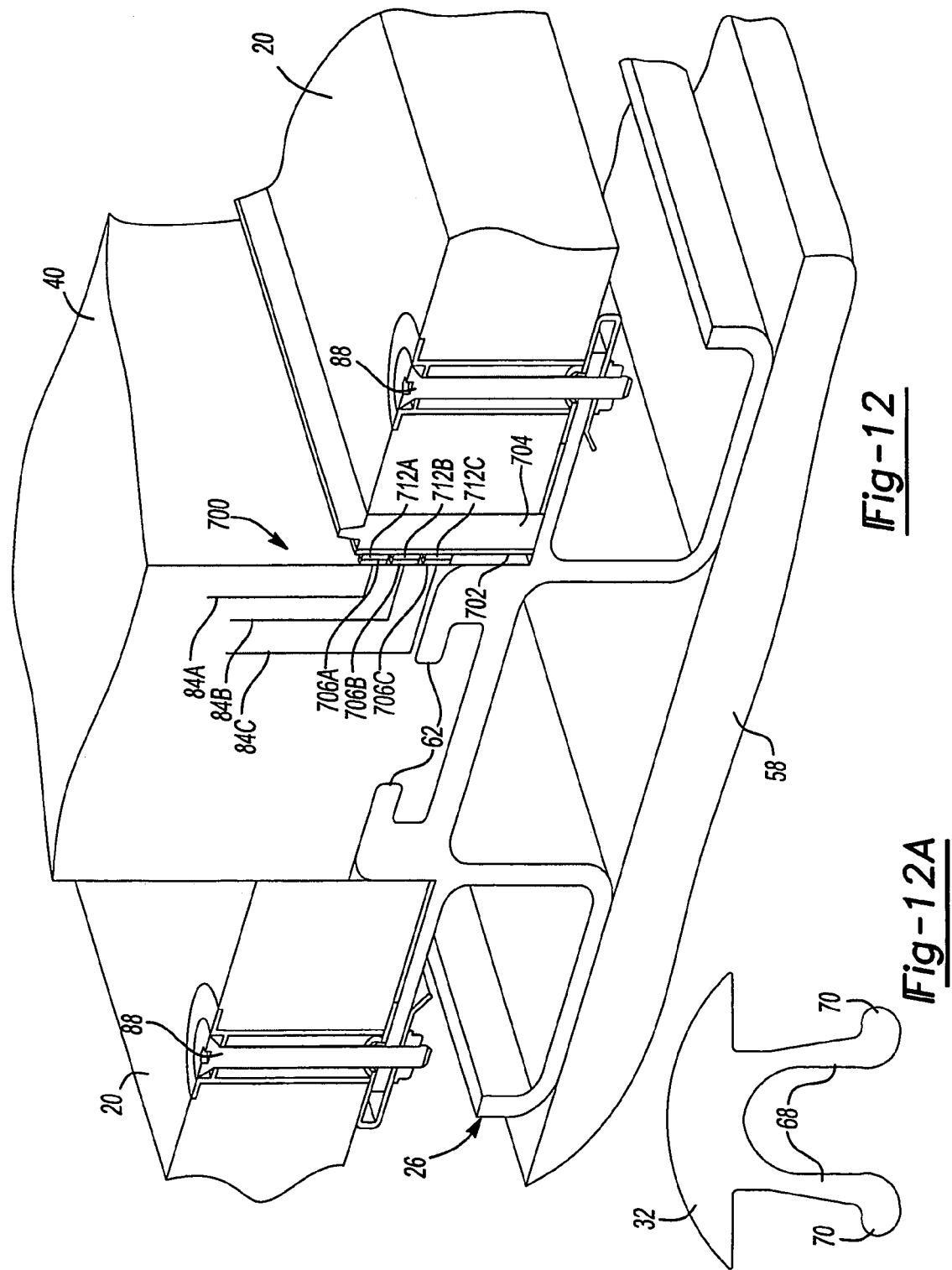
FIG. 12 is a perspective, cross-sectional view of a power bus system according to yet a further embodiment of the present invention.
FIG. 12A is a side view of a seat track cover used in the embodiment of FIG. 12.

FIG. 12 illustrates an additional embodiment of the power bus system of the present invention at reference numeral 700. Because many of the components of the embodiment of FIG. 12 are substantially similar to those of FIGS. 2 through 5, like reference numbers are used to identify the similar components and the above detailed description sufficiently describes these components. The power bus system 700 also operates in a manner similar to the power bus system 28 and, therefore, the above description detailing the operation of the power bus system 28 equally applies to power bus system 700.

The power bus system 700 generally includes a flat wire power bus 702, a seal 704, and at least one contact 706 on the seat leg 40. As illustrated, three contacts 706A, 706B, and 706C are provided and each contact 706 is connected to one of the wires 84A, 84B, and 84C respectively. The wires 84 extend to the seat group 24 as described above.

The seal 704 is secured to a side portion of the floor 20 in any conventional manner, such as by an adhesive. The seal 704 can be made from a suitable elastic substrate, such as silicon foam rubber. The flat wire power bus 702 is secured to the seal 704 in any conventional manner, such as by using an adhesive. The power bus 702 extends across a portion of the passenger cabin 18 just above the seat track 26. The power bus 702 includes one or more contacts 712. As illustrated, the power bus 702 includes a first contact 712A that receives a power input from the power source 30, a second contact 712B that acts as a power return to the power source 30, and a third contact 712C that grounds the power bus system 700. The contacts 712 are made of any suitable conductive material, such as copper.

With the seal 704 and the power bus 702 in place at the floor 20, the seat leg 40 is secured to the seat track 26 such that the contacts 706 are in electrical contact with the contacts 712. Specifically, the contacts 712A, 712B, and 712C are in electrical contact with the contacts 706A, 706B, and 706C respectively. The total thickness of the flat wire 702 and the seal 704 is slightly greater than the gap between the seat leg 40 and the edge of the floor panel 20 such that the seal 704 becomes compressed upon installation of the seat leg 40. This compression force biases the flat wire 702 towards the contacts 706 on the leg 40 to ensure adequate contact force between the contacts 706 and contacts 712. The seat cover 32, according to the embodiment of FIG. 12A, is placed over the seat track 26 and the power bus 702 and secured in position through cooperation between the locking details 70 of the cover 32 and the arms 62 of the seat track 26.

In operation, the contact 712A supplies power to the seat group 24 via the contact 706A and the wire 84A; power is returned to the power source 30 via the wire 84B, the contact 706B, and the contact 712C; and the power bus system 700 is grounded by the wire 84C, the contact 706C, and the contact 712C, which is grounded to a suitable ground surface using a conventional connector.

It must be noted that features of the embodiment of FIG. 12 can be incorporated within any of the other embodiments described herein. For example, the flat wire power bus, with or without the seal 704 can be mounted to the vertical portion 208 of the power bus bracket 202 of FIG. 6 to take the place of the contacts 210.

FIG. 13 illustrates an additional embodiment of the power bus system of the present invention at reference numeral 800. Because many of the components of the embodiment of FIG. 13 are substantially similar to those of FIGS. 2 through 5, like reference numbers are used to identify the similar components and the above detailed description sufficiently describes these components. The power bus system 800 also operates in a manner similar to the power bus system 28 and, therefore, the above description detailing the operation of power bus system 28 equally applies to power bus system 800.

The power bus system 800 generally includes a power bus strip 802 and a power bus strip engagement arm 804. The power bus strip 802 extends across at least a portion of the floor 20 of the aircraft passenger cabin 18 at or near the legs 40. The power bus strip 802 includes a base 806 and a cover flap 808. The base 806 is secured to the flap 808 at a hinge 810. The strip 802 is any suitable non-conductive material, such as a resilient rubber. Extending at least a portion of the length of the base 806 are contacts 812 made of any suitable material, such as copper. As illustrated, the power bus strip 802 includes a first contact 812A that receives power from the power source 30, a second contact 812B that acts as a power return to the power source 30, and a third contact 812C that grounds the power bus system 800.

The power bus engagement arm 804 generally includes an extended portion 814 that is rotationally secured to the seat leg 40 by a suitable connection, such as a rotational bolt 816. The extended portion 814 includes one or more contacts 818. As illustrated, the extended portion 814 includes a first contact 818A connected to the first wire 84A, a second contact 818B connected to the second wire 84B, and a third contact 818C connected to the third wire 84C.

During assembly of the power bus system 800, the extended portion 814 of the arm 804 is rotated to a position such that it does not extend over the area of the floor 20 where the power bus strip 802 is to be installed. The power bus strip 802 is seated on the floor 20 at or near the seat leg 40. The power bus strip 802 is secured using a suitable adhesive or mechanical fastening device. The flap 808 is next opened and the extended portion 814 is rotated so that it extends within the power bus strip 802 between the flap 808 and the base 806 with the contacts 818A, 818B, 818C making electrical contact with the contacts 812A, 812B, and 812C respectively. The flap 808 is then closed and sealed using a suitable sealant. The sealant can be the gel Geltek. In operation, the contact 812A supplies power to the seat group 24 via the contact 818A and the wire 84A; power is returned to the power source 30 via the wire 84B, the contact 818B, and the contact 812B; and the power bus system 800 is grounded by the wire 84C, the contact 818C, and the contact 812C, which can be grounded to a suitable ground surface using a conventional connector.

Figure 14:
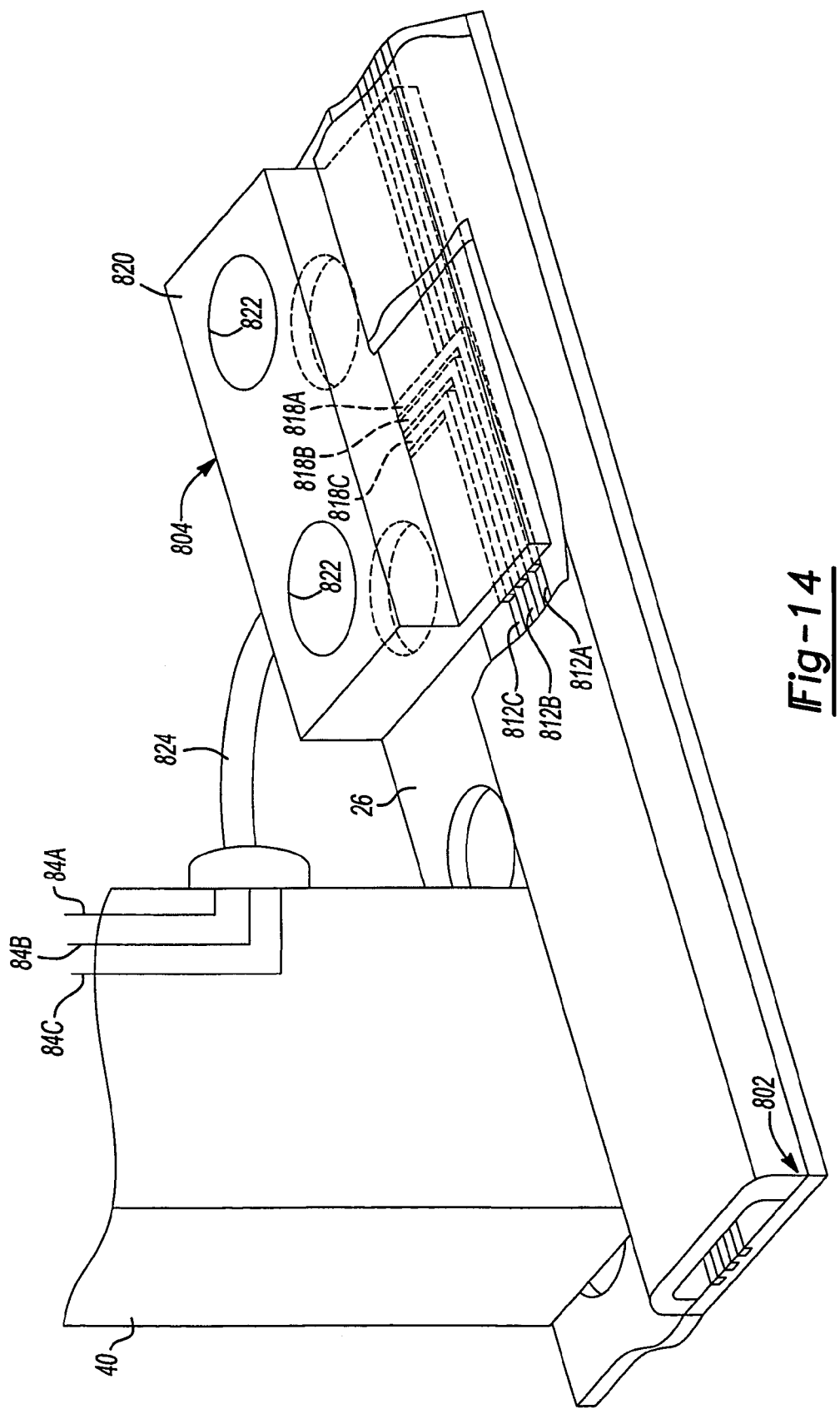
FIG. 14 is a perspective partially cut-away view of a power bus system according to an additional embodiment of the present invention.

The power bus engagement arm 804 can take the form of numerous different configurations in addition to that described above. For example, instead of being rotatable about the bolt 816, the arm 804 may be on a siding track (not shown) such that the arm 804 extends to and from the area of the power bus strip 802 in a "switchblade" fashion, without rotating. Further, with additional reference to FIG. 14, the power bus engagement arm 804 can also include a mounting portion 820 that includes one or more apertures 822 that receive one or more fasteners to secure the power bus engagement arm 804 to the base 806 of the power bus strip 802 or the seat track 26 (FIG. 14). Communication between the wires 84 and the contacts 818 of the engagement arm 804 can be provided by a cable 824 that extends from the arm 804 to cooperate with a receptor in the seat leg 40 that is in further communication with the wires 84.

Figure 15:
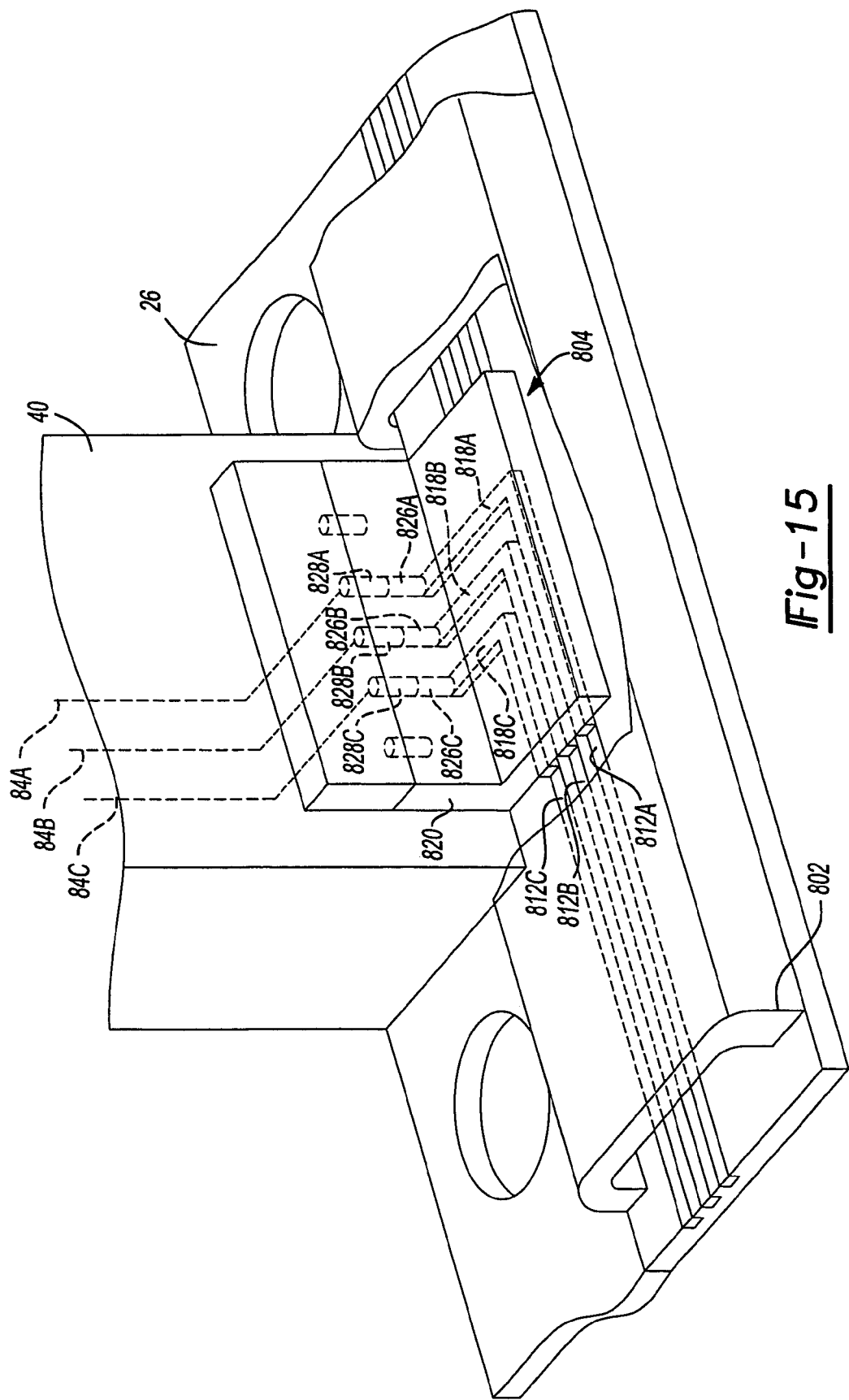
FIG. 15 is a perspective, partially cut-away view of a power bus system according to a further embodiment of the present invention.

With additional reference to FIG. 15, the mounting portion 820 can further include not only apertures 822 to accept a fastener to secure the engagement arm 804, but also contacts 826. The contacts 826 can be any suitable conductive material, such as copper. The contacts 826 are in communication with the contacts 818 of the power bus engagement arm 804.

As illustrated in FIG. 15, three contacts 826A, 826B, and 826C are provided and each communicate with contacts 818A, 818B, and 818C respectively. The contacts 826 are configured to mate with similar contacts 828A, 828B, 828L within or near the bottom portion of the seat leg 40. During installation of the seat group 24, with the engagement arm 804 including the contacts 826 in place at the seat track 26, the seat leg 40 is inserted over the engagement arm 804 such that the contacts 826 mate with the corresponding contacts 828 of the seat leg 40, thereby providing communication between the wires 84 of the seat and the contacts 812 of the power bus strip 802.

Figure 16:
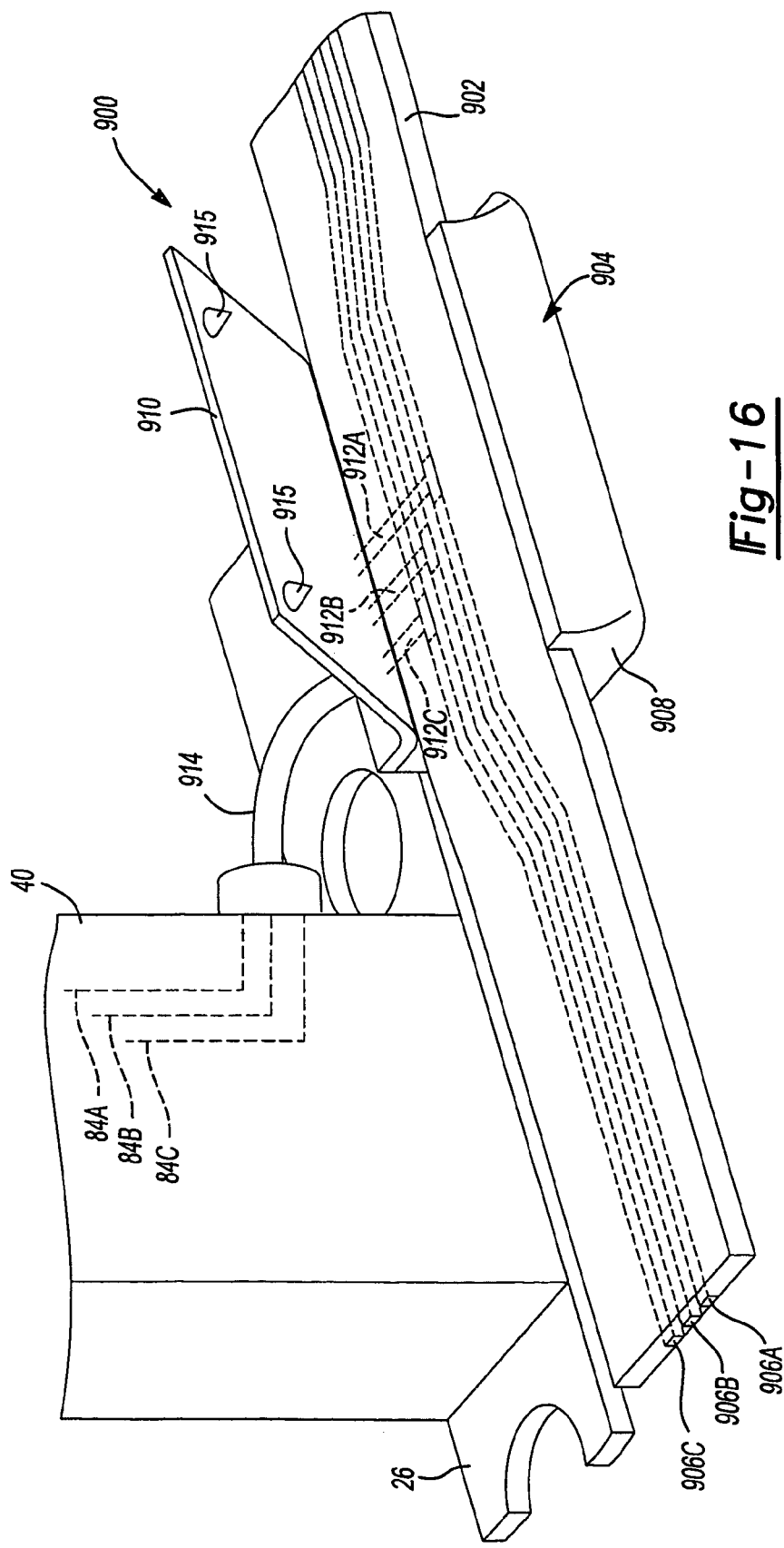
FIG. 16 is yet another perspective view of a power bus system of the present invention.

FIG. 16 illustrates an additional embodiment of the power bus system of the present invention at reference numeral 900. Because many of the components of the embodiment of FIG. 16 are substantially similar to those of FIGS. 2 through 5, like reference numbers are used to identify the similar components and the above detailed description sufficiently describes these components. The power bus system 900 also operates in a manner similar to the power bus system 28 and, therefore, the above description detailing the operation of power bus system 28 equally applies to power bus system 900.

The power bus system generally includes a power bus 902, and a power bus receptacle 904. As illustrated, the power bus 902 is a flat wire power bus. The power bus 902 includes one or more contacts 906, which are embedded within the power bus 902. As illustrated, the power bus 902 includes a first contact 906A that receives a power input from the power source 30, a second contact 906B that serves as a power return to the power source 30, and a third contact 906C that grounds the power bus system 900. The contacts 906 can be made of any suitable conductive material, such as copper.

The power bus receptacle 904 has a base 908 and a cover 910. The base 908 includes one or more contacts 912. As illustrated, the base includes a first contact 912A, a second contact 912B, and a third contact 912C. The cover 910 can be moved between a first position where the cover 910 covers the contacts 912 and a second position where the cover 910 permits ready access to the contacts 912 (FIG. 16). The contacts 912A, 912B, and 912C are in communication with the wires 84A, 84B, and 84C respectively of the seat leg 40 through a suitable connection, such as a pig tail connector 914.

During assembly of the power bus system 900, the power bus receptacle 904 is positioned at or near the seat legs 40. The receptacle 904 is secured in position to the floor 20 beneath any carpeting that might be placed over the floor 20 using a conventional adhesive or mechanical fastening system. The contacts 912 of the receptacle 904 are brought into electrical contact with the wires 84 using the connector 914. The power bus 902 is positioned along the passenger cabin 18 such that it extends over the base 908. At the base 908, at least a portion of the power bus 902 covering the contacts 906 is removed to expose the contacts 906 and permit electrical contact between the contacts 906 and the contacts 912. To maintain this electrical connection and to secure the power bus 902 in place, the cover 910 is then closed over the power bus 902 to cause piercers 915 to engage the power bus 902. The cover 910 can include a seal to prevent water or other substances from disrupting the connection between the contacts 912 of the base 908 and the contacts 906 of the power bus 902. To conceal the power bus 902 and the receptacle 904, they may be positioned below carpeting of the floor 20

Figure 17:
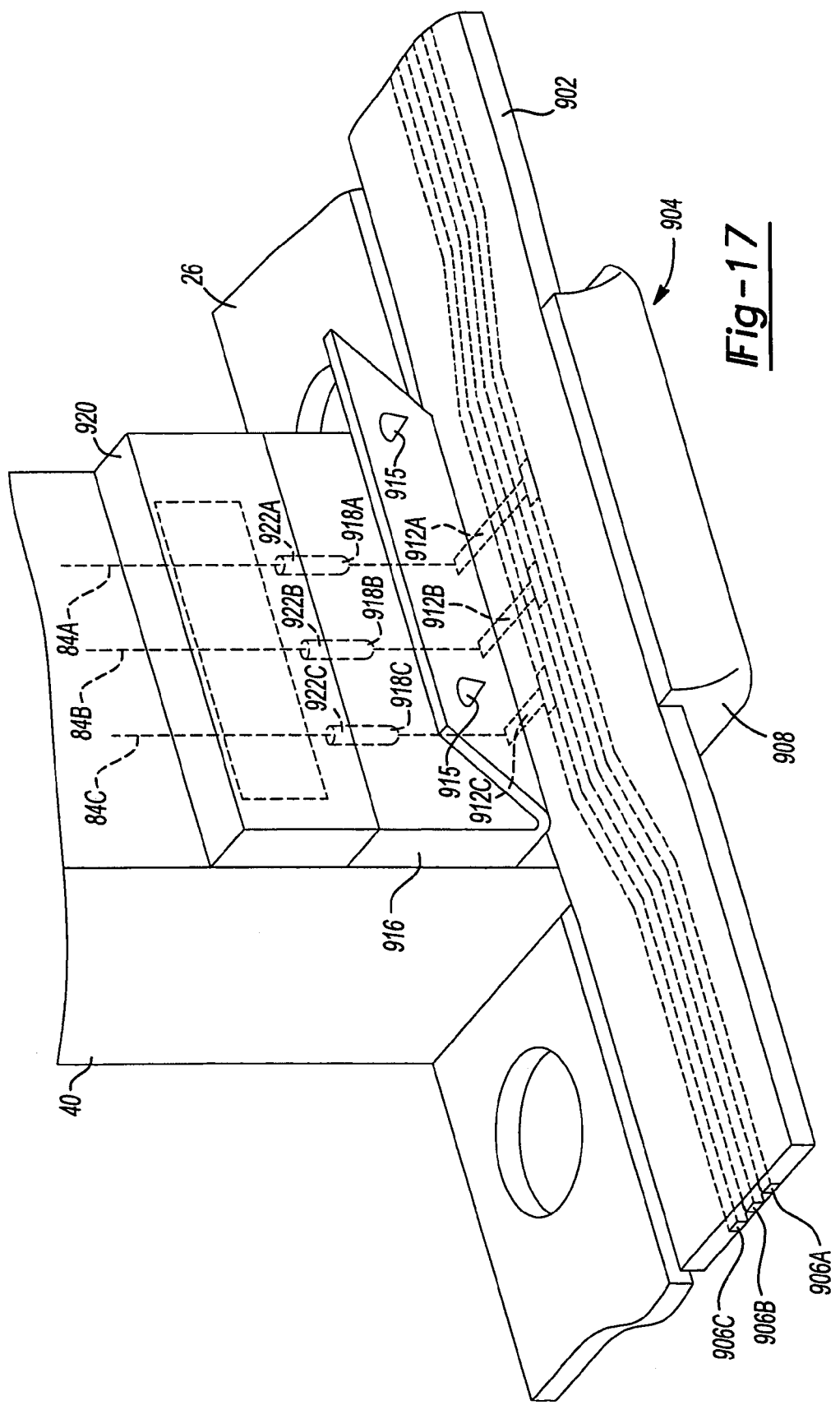
FIG. 17 is still another perspective view of a power bus system of the present invention.

The power bus system 900 can take the form of numerous other embodiments in addition to those described above. For example, the receptacle 904 can be integrated with the seat leg 40 itself or be at the end of a wiring pigtail off of the seat group 24. In some applications, the receptacle 904 can be secured to the seat leg spreader (not shown) which extends between the seat legs 40 at the bottom of the seat legs 40. Further, with reference to FIG. 17, the receptacle 904 can include a coupling device 916 having one or more contacts 918 that are in cooperation with the contacts 912. As illustrated, the coupling device 916 has a first contact 918A in cooperation with the first contact 912A, a second contact 918B in cooperation with second contact 912B, and a third contact 918C in cooperation with the third contact 912C. The seat leg 40 can include a corresponding coupling device 920 having contacts 922. As illustrated, coupling device 920 can have a first contact 922A in cooperation with the first wire 84A, a second contact 922B in cooperation with the second wire 84B, and a third contact 922C in cooperation with the third wire 84C. During installation, the seat leg 40 can be inserted over the power bus receptacle 904 such that the contacts 922 of the coupling device 920 are placed in electrical connection with the contacts 918 of the power bus receptacle, thereby providing electrical communication between the wires 84 of the seat leg 40 and the contacts 906 of the power bus 902 when the power bus 902 is in contact with the receptacle 904.

Figure 18:
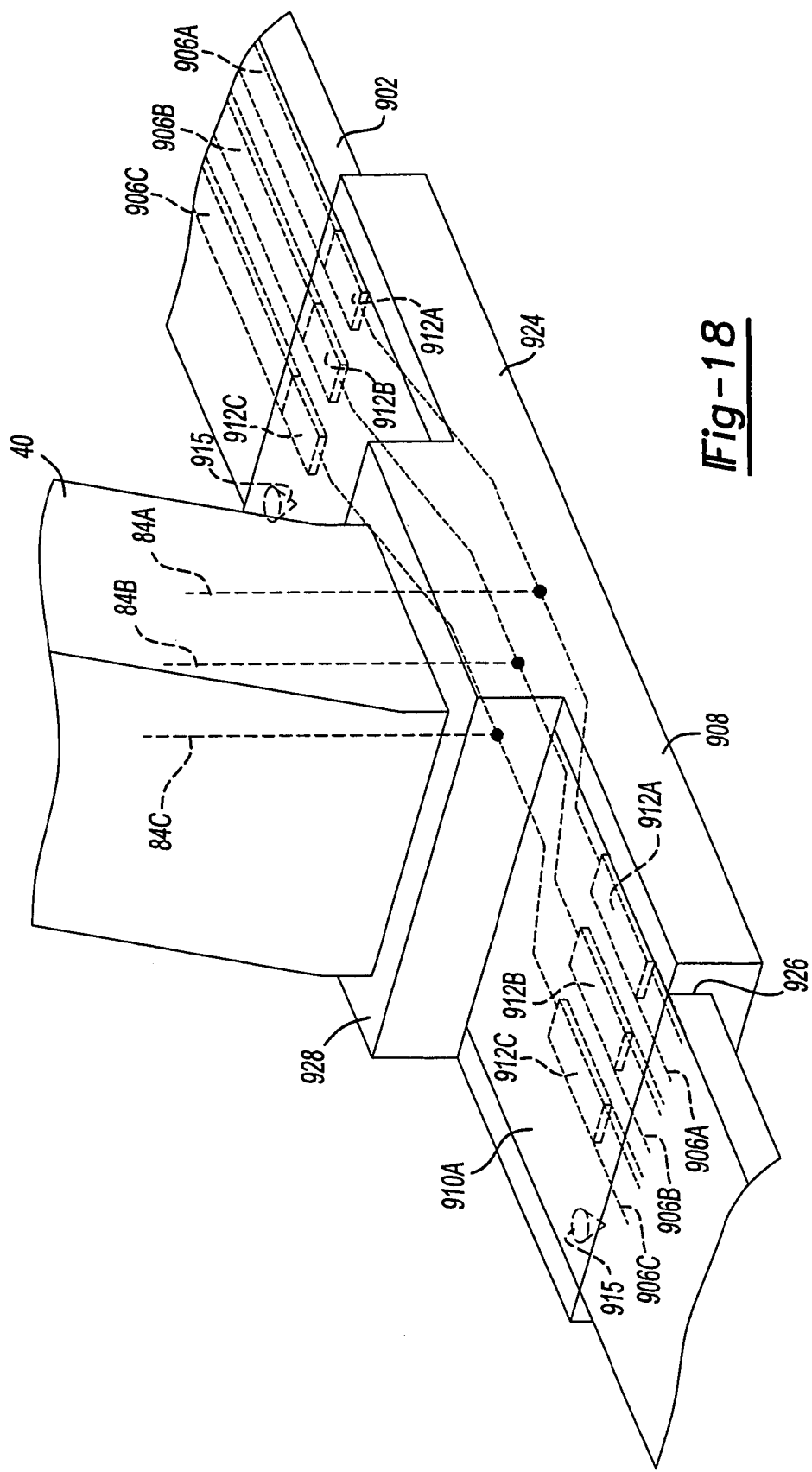
FIG. 18 is a perspective view of a further embodiment of a power bus system of the present invention.

With reference to FIG. 18, in yet another embodiment the power bus receptacle includes an extension or shoe 924. The embodiment of FIG. 18 is similar to that of FIG. 16, thus like components are illustrated using like reference numbers and a description of the like components provided above also applies here. The shoe 924 generally includes a first cover 910A and a second cover 910B. The shoe 924 also includes a center aperture 926 through which the power bus 902 extends. The shoe 924 can be integrated with the bottom of the seat leg 40 or can include a receptor 928 for receiving and securing the seat leg 40. The shoe 924 typically receives the power bus 902 where it runs between the seat groups 24. With regards to installation and operation, the power bus 902 is fed through the center aperture 926 so that the contacts 906 make electrical contact with the contacts 912. To secure the power bus 902 in place, a sealant can be used between the power bus 902 and the base 908 and piercers 915 can be provided at the cover 910 to pierce and secure the edges of the power bus 902 when the cover 910 is closed.

Contacts 912 below the first cover 910A are routed both up the seat leg 40 via wires 84 and around the seat leg 40 to contacts 912 common below the second cover 910A. An additional embodiment includes a total of five contacts beneath each cover 910 to support three-phase electrical power, current return and safety ground. In this case, contacts 912A, 912B, 912C, 912D (not shown) and 912E (not shown) at the first cover 910A are respectively connected to contacts 912A, 912B, 912C, 912D (not shown) and 912E (not shown) at the second cover 910A. Alternatively, the three power phases may be rotated between the different portions at the base 908 such that, for example, power contacts 912A, 912D and 912E at the first cover 910A are respectively connected to contacts 912E, 912A and 912D, where contacts 912A, 912D and 912E are used for each of the three power phases.

Figure 19:
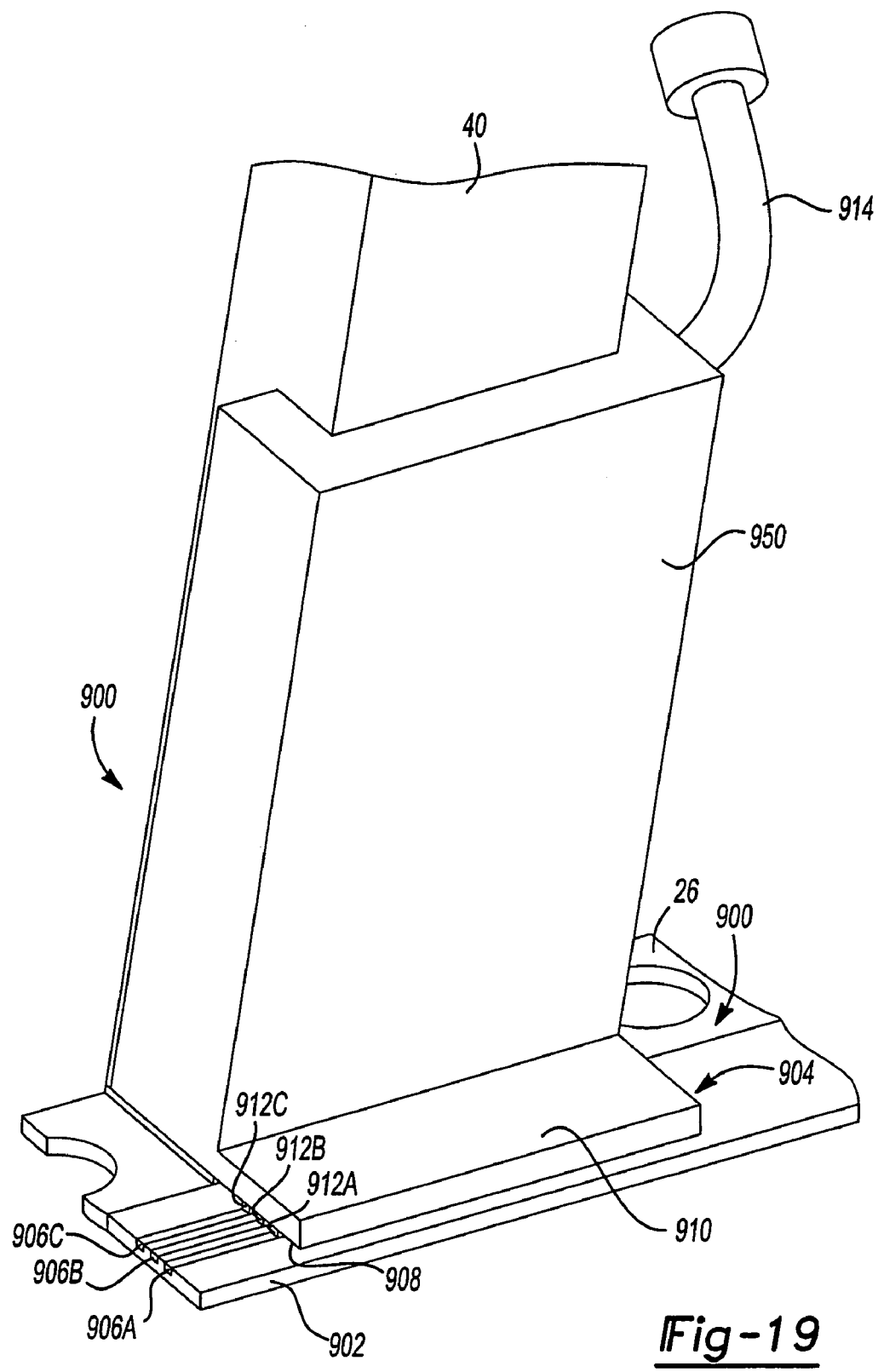
FIG. 19 is a further perspective view of a power bus system of the present invention.

With reference to FIG. 19, the power bus receptacle 904 of the power bus system 900 can include a seat clamp 950. The clamp 950 can include locking details (not shown) to secure the clamp 950 to the seat leg 40. The base 908 and the cover 910 are integrated with the clamp or are secured to the clamp 950 in any suitable manner. Via the clamp 950, the power bus receptacle 904 is secured to the seat leg 40. The connector 914, which provides electrical connections between the contacts 912 and the wires 84, extends between the seat clamp 950 and the leg 40 away from the floor 20 to protect the connector 914. Eventually, the connector 914 extends out from between the seat leg 40 and the seat clamp 950 to permit connection to the wires 84. The power bus receptacle 904 extends to the side of the seat track 26, as illustrated in FIG. 19, or extends over the seat track to permit a seat-to-seat serial connection.

Figure 20:
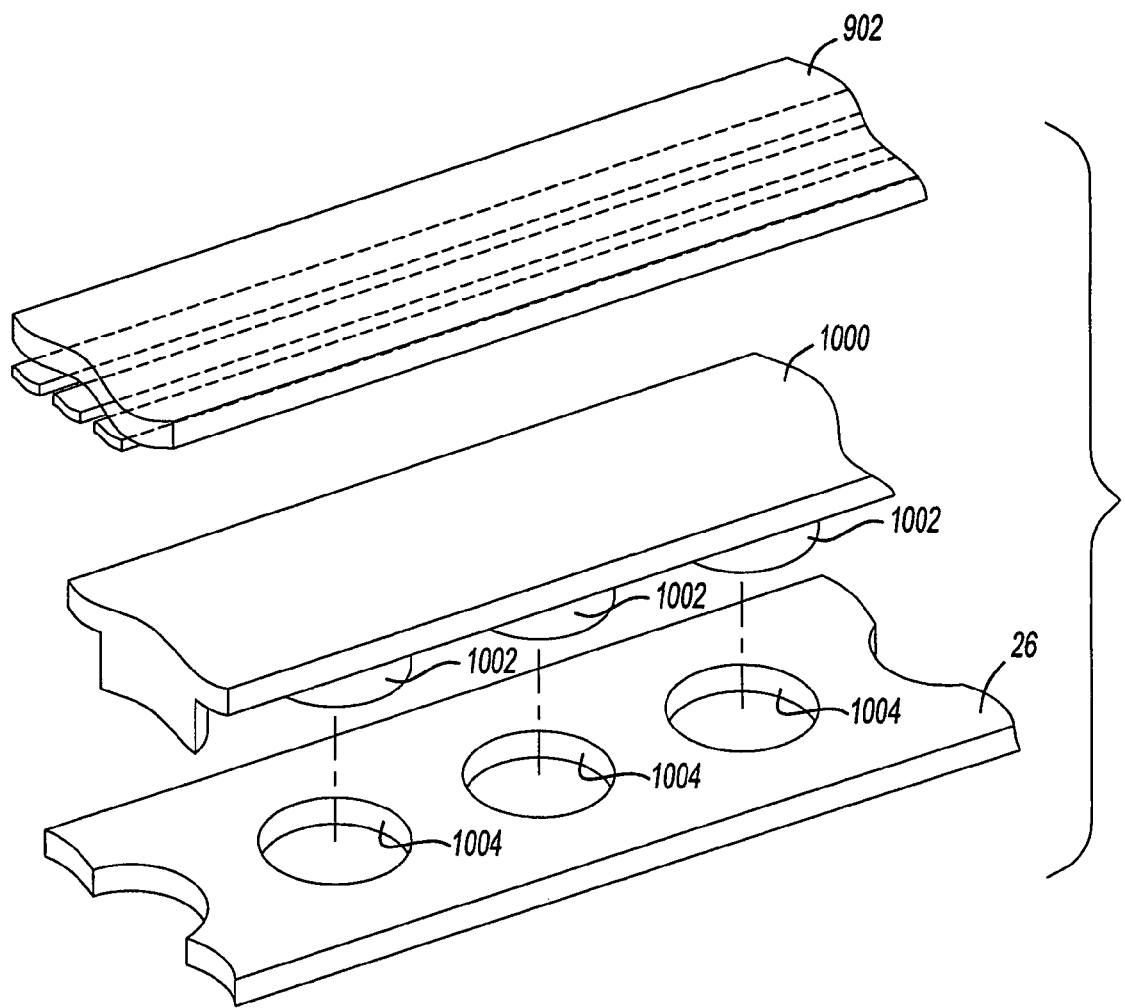
FIG. 20 is an exploded view of a seat track cover for use in any of the power bus systems of the present invention.

With reference to FIG. 20, regions of the seat track 26 between the seat groups 24 can be covered using a seat track filler 1000. The seat track filler 1000 is an elongated plate having a width similar to the width of the seat track 26. An under surface of the filler 1000 has extensions 1002 that cooperate with similarly shaped receptacles 1004 of the seat track 26 to secure the seat track filler 1000 in place. The filler 1000 can be used in any of the applications described herein, such as when the power bus 902 is used. For example, if the power bus 902 is positioned over the seat track 26 to provide a serial connection between the seat groups 24, the filler 1000 is first placed over the seat track 26 to provide a solid, smooth surface to support the power bus 902.

Figure 21:
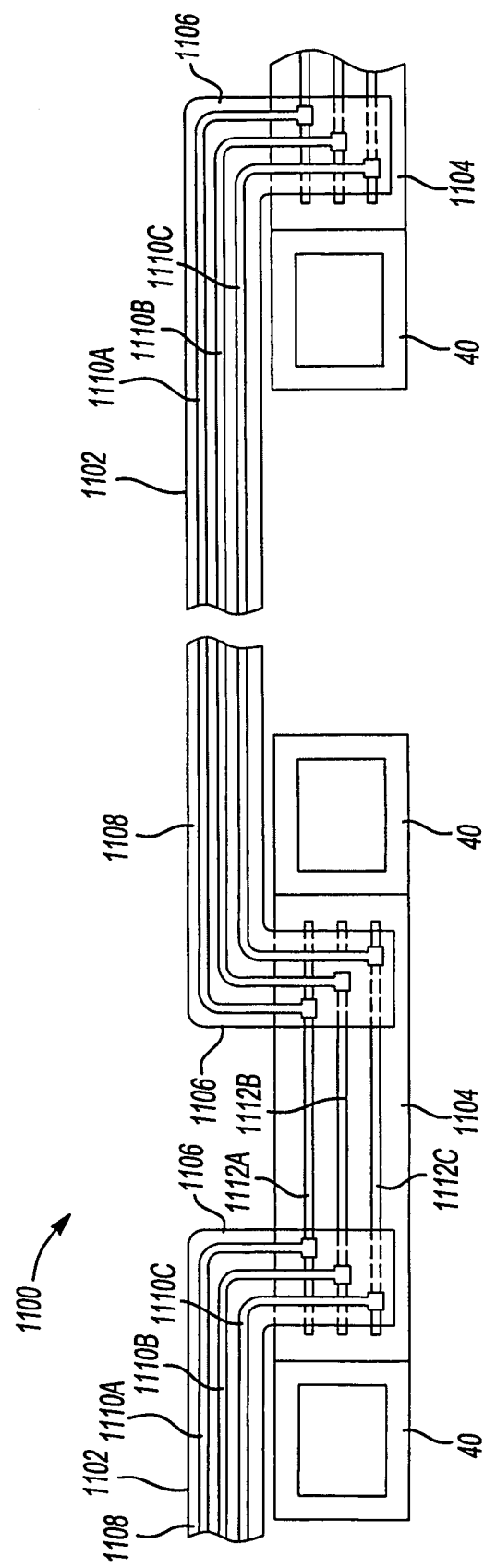
FIG. 21 is a plan view of a power bus flat wire conductor and seat spreaders with contacts for making electrical contact with the flat wire at a variety of different locations along the length of the spreaders.

FIG. 21 illustrates an additional embodiment of the power bus system of the present invention at reference numeral 1100. Because many of the components of the embodiment of FIG. 21 are substantially similar to those of FIGS. 2 through 5, like reference numbers are used to identify the similar components and the above detailed description sufficiently describes these components. The power bus system 1100 also operates in a manner similar to the power bus system 28 and, therefore, the above description detailing the operation of power bus system 28 equally applies to power bus system 1100.

The power bus system 1100 generally includes one or more power buses 1102 and a seat leg spreader 1104. The power buses 1102 are substantially similar to the power bus 902 and thus need not be described in detail. For example, each power bus 1102 includes contacts 1110A, 1110B, 1110C that are identical to the contacts 906A, 906B, and 906C of the power bus 902. As illustrated, the power buses 1102 each include end portions 1106 and body portions 1108, with the end portions 1106 extending approximately 90 degrees from the body portions 1108.

The spreader 1104 extends between the legs 40 of the seat group 24 and is integrated with the legs 40. The spreader 1104 includes contacts 1112 that are exposed to permit contact with the contacts 1110 of the power bus 1102. The contacts 1112 can be any suitable conductive material, such as copper traces embedded within the spreader 1104 to span a large portion of the length of the spreader. As illustrated, the spreader 1104 includes a first contact 1112A, a second contact 1112B, and a third contact 1112C. Each contact 1112A, 1112B, and 1112C is in electrical contact with one of the wires 84A, 84B, and 84C respectively. During assembly, the power buses 1102 are positioned to extend between different spreaders 1104 of different seat groups 24. In particular, the power busses 1102 are positioned so that the contacts 1110A, 1110B, and 1110C are each in electrical contact with the contacts 1112A, 1112B, and 1112C of the spreader 1104. Because the contacts 1112 extend across the length of the spreader, the power buses 1102 can be positioned at approximately any position along the length of the spreader 1104. Therefore, if the distance between the seat groups 24 is great, the power bus 1102 can be positioned at the end of the spreader 1104, near the seat leg 40, to increase the distance that the power bus 1102 extends from the, spreader 1104. Conversely, if the distance between the seat groups 24 is small, the power bus 1102 can be positioned more towards the center of the spreader 1104 to decrease the distance that the power bus 1102 extends from the spreader 1104. Therefore, the same length power bus 1102 can be used between seat groups 24 of varying distances apart. Alternatively, the contacts 1112 on the spreader 1104 can be replaced with two connectors designed to slide along the spreader bar 1104 to align with and be connected to the flat wire power bus 1102.

Figure 22:
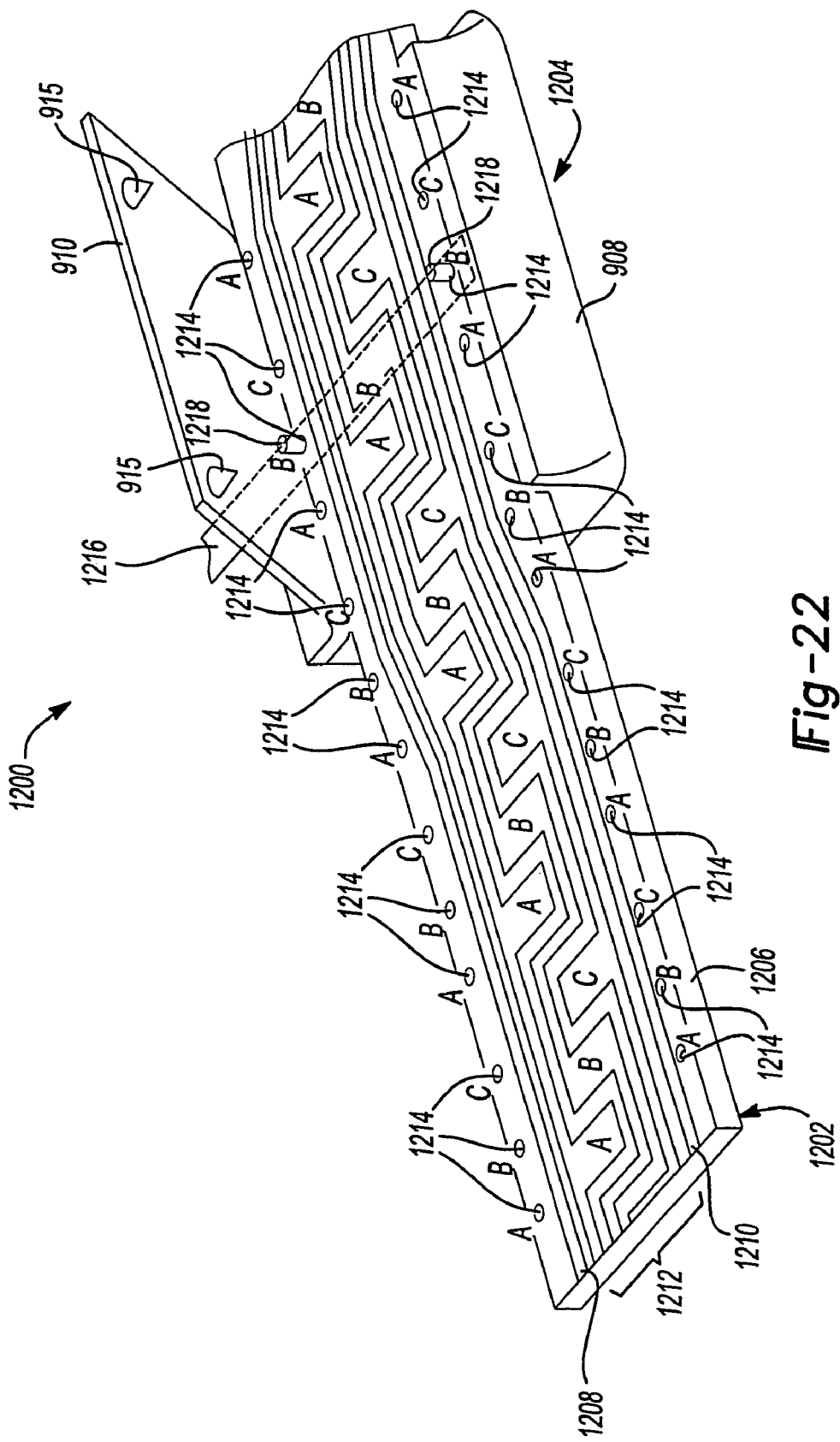
FIG. 22 is a perspective view of a three phase flat wire conductor and corresponding receptor according to an embodiment of the present invention.

FIG. 22 illustrates an additional embodiment of a power bus system of the present invention at reference numeral 1200. The system 1200 generally includes a flat wire power bus 1202 and a receptacle 1204. The flat wire power bus 1202 includes a base 1206 and a flap, which is not illustrated, so as to better show the features of the system 1200, but is substantially similar to the flap 808 of FIG. 13. The flap covers the base 1206.

The base 1206 includes a plurality of electrical contacts. For example, the base 1206 includes a ground contact 1208, a power return 1210 and three phase power contacts 1212 having phases A, B and C. Further, the base 1206 includes a plurality of guide holes 1214 on both sides of each phase A, B, C of the contacts 1212. The guide holes 1214 include a label indicating which power phase the hole 1214 is next to. As illustrated, all holes 1214 include a letter designation of either A, B, C representing phase A, B, or C. As with the other embodiments described above, the contacts 1210, 1212 can be in electrical contact with the power source 30.

The receptacle 1204 is similar to the receptacle 904 (FIG. 16) described above and like reference numbers are used to designate like components. However, unlike the receptacle 904 the receptacle 1204 only has a single contact 1216 to mate with the power bus 1202 and at least one guide post 1218. The receptacle 1204, via the contact 1216, is connected to the wires 84 to provide power to the seats 22.

The system 1200 permits ready connection to one or more power phases A, B, C of the multi-phase power bus 1201. For example, if phase B power is desired, the power bus 1202 is positioned at the receptacle 1204 such that guide holes 1214 B next to the B phase power contact are seated over the guide posts 1218. When the power bus 1202 is in this position, the contact 1216 mates with phase B contact 1212 to conduct phase B power.

It will be appreciated that the power bus 1201 and the receptacle 1204 may be used in a wide variety of applications in addition to the application described herein. For example, the power bus 1202 and receptacle, or variations thereof, can be used whenever there is a need in an application to utilize one or more power phases of a multi-phase power cable. Further, it must be noted that the power bus 1202 can include greater or fewer power phases than set forth herein and the receptacle 1204 can include additional contacts 1216 to contact additional power phases.

Figure 23:
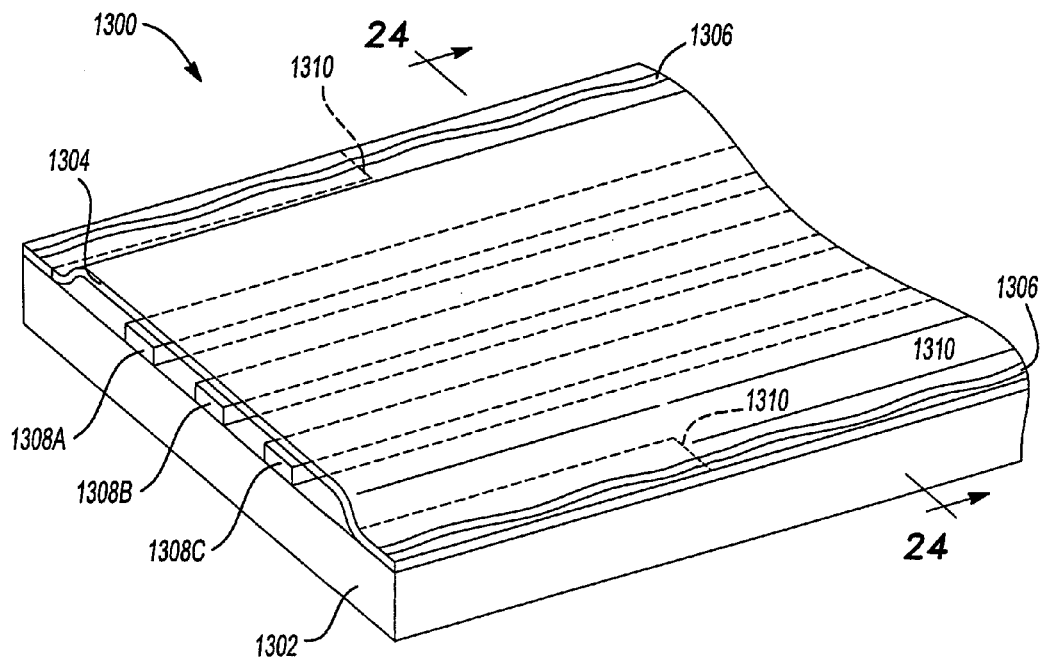
FIG. 23 is a perspective view of a flat wire conductor according to yet an additional embodiment of the present invention.
Figure 24:
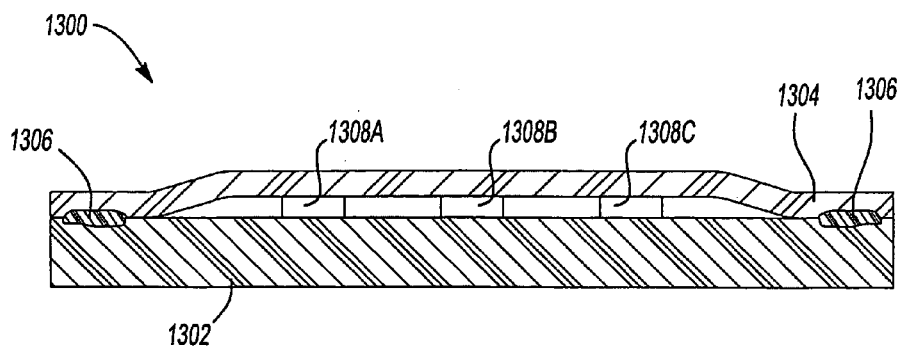
FIG. 24 is a cross-sectional view taken along line 24-24 of FIG. 23.

FIGS. 23 and 24 illustrate a flat wire conductor 1300 according to another embodiment of the present invention. The flat wire conductor 1300 can be used in any of the other embodiments described herein and also in any other application requiring a cable for power transfer.

The flat wire 1300 generally includes a base 1302 and a cover 1304. The base is secured to the cover using a sonic weld 1306. The base 1302 can be made of any suitable material, such as a polymeric material. While the base 1302 is flexible, it typically has a degree of rigidity greater than the cover 1304, which also can be made of a polymeric material. Traced on the base 1302 are one or more conductors 1308, typically made of copper.

In use, the flat wire 1300 is first cut to length, typically from a large spool of the flat wire 1300. Next, the access to the conductors 1308 is obtained. Access to the conductors 1308 is obtained by creating a notch 1310 by cutting through the sonic weld edge 1306 at the end of the wire 1300 and subsequently peeling back the less rigid cover 1304, thereby exposing the conductors 1308 for use.

Figure 25:
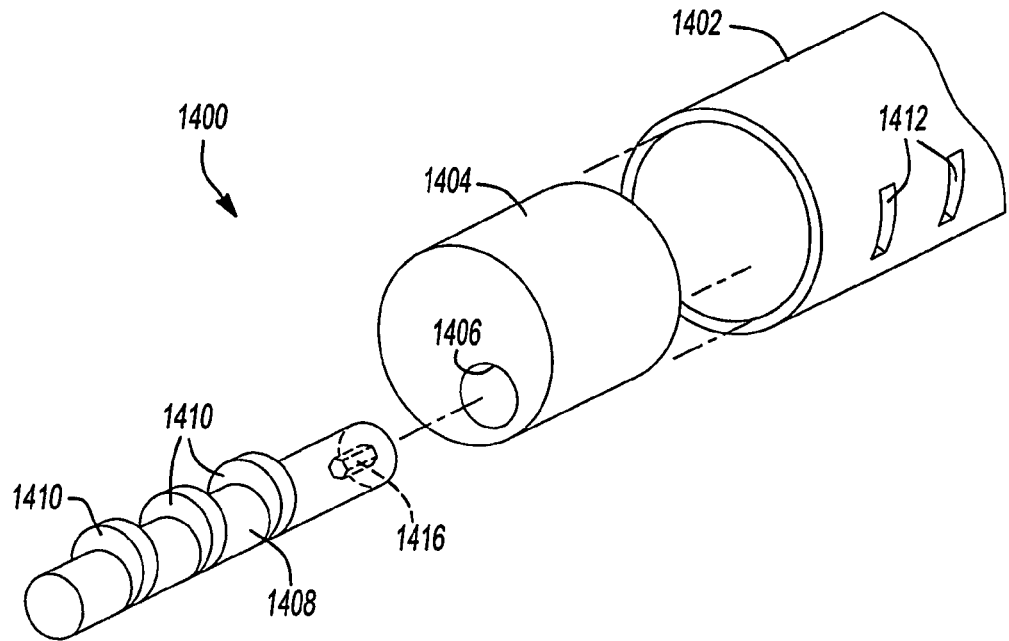
FIG. 25 is an exploded perspective view of an additional conductive connector of the present invention.
Figure 26:
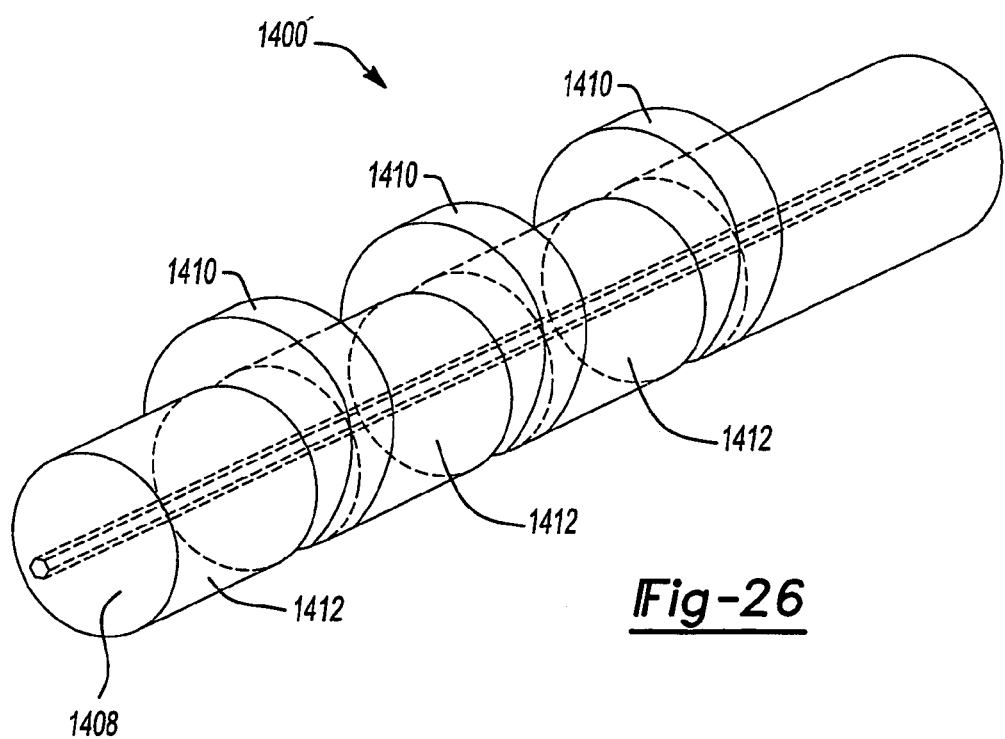
FIG. 26 is an exploded perspective view of a cam shaft of the connector of FIG. 25.

With additional reference to FIGS. 25 and 26, an additional embodiment of a conductive connector is illustrated at reference numeral 1400. The connector 1400 can be used in any of the above described embodiments. For example, the connector 1400 can be used in place of or in addition to connectors 404 and 504 above. The connector 1400 generally includes an outer housing 1402, an inner housing 1404 with a bushing 1406, and a cam shaft 1408 with cams 1410.

The outer housing 1402 receives the inner housing 1404. The outer housing 1402 includes slots 1412 sized to receive the cams 1410. The bushing 1406 of the inner housing 1404 rotationally receives the cam shaft 1408. The inner housing 1404 can be configured to rotate within the outer housing 1402 and/or the cam shaft 1408 can be configured to rotate within the bushing 1406.

The cams 1410 protrude from the cam shaft 1408 at predetermined intervals and are conductive cams operable to conduct signals, such as current and/or data. The cams 1410 are separated from each other by insulating spacers 1412 (FIG. 26). The bushing 1406 that the cam shaft 1408 is secured to is offset from the axial center of the barrel.

Rotation of the cam shaft 1408 in a first direction using, for example engagement hole 1416, causes the cams 1410 to protrude from the openings 1412 within the outer housing 1402 to mate with, when the connector 1400 is used in the embodiment of FIG. 8 for example, the bus 402. Rotation of the cam shaft 1408 in a second direction opposite the first direction causes the cams 1410 to retract within the outer housing 1402. Retracting the cams 1410 within the housing protects the cams during insertion and retraction of the connector 1400 into position proximate the bus, such as bus 402 of FIG. 8.

It will be appreciated that while the above embodiments generally describe delivering power to the seats 22, each of the embodiments can also be used to deliver data or other electrical signals to the seats via conventional communication over power line systems.

It must also be noted that each of the above embodiments may be outfitted with optical connections to transmit data to the seats 22 using conventional fiber optic technology.

Still further, it must be noted that any of the above embodiments can be used to provide serial data/power connections between each seat 22 or individually to each seat and that the number of contacts and wires may be greater or lesser than the three generally described above.

The locking devices and locking features for seat track cover 32 may be located differently than described above and may engage with, for example, features of the seat track 26 or floor panels 20.

The present invention, while being especially well suited and advantageous for use on mobile platforms that require data port and/or power connections, can also just as readily be implemented in a fixed structure having a plurality of seats or other locations requiring data port and/or power connections. Such an implementation would also significantly reduce the complexity of the cabling and connections needed to supply power and/or data lines to the seats.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for distributing signals to a plurality of seats that are mounted to a seat track at a floor surface, the seat track having a plurality of spaced apart openings formed thereal-ong, the system comprising:
    a conductive bus mounted beneath the floor surface, said conductive bus is spaced apart from said seat track, in vertical alignment with said openings in said seat track, and extends along each of said seats, said bus is operable to conduct signals along an entire length of said bus, said bus includes a base portion and two side walls extending from said base portion, each of said side walls include a contact that is spaced apart from said base portion and the floor surface; and
    a connector adapted to plug into said bus and mate with said contacts through one of said openings in said seat track so as to extend to a point below the floor and proximate a leg of the seat;
    wherein said bus is operable to permit cooperation with said connector at substantially any point along a length of said bus.

2. The system of claim 1, wherein said bus includes a fiber optic system.

3. The system of claim 1, wherein said bus is comprised of copper.

4. The system of claim 1, wherein said connector includes a recess that cooperates with said seat track.

5. The system of claim 1, wherein said bus extends to said seats from a source of said signals.

6. The system of claim 1, further comprising a passenger seat electronic subsystem provided at the seats for distributing said signals at the seats, the subsystem is connected to a second seat track to ground the subsystem.

7. An aircraft passenger cabin system for distributing signals throughout a passenger cabin comprising:
    a passenger cabin floor;
    a seat track extending across said floor, said seat track mounted on a sub floor that is located beneath said floor, said seat track having a plurality of openings therethrough;
    one or more passenger seats mounted to said seat track at said floor;
    a conductive bus spaced apart from said seat track and mounted to said sub floor between said sub floor and said floor, said bus in vertical alignment with said openings of said seat track, said bus operable to conduct said signals along substantially an entire length of said bus, said bus includes a base portion and two side walls extending from said base portion, each of said side walls include a contact that is spaced a part from said base portion and said floor; and
    a connector adapted to plug into said bus and mate with said contacts through one of said openings so as to extend to a point below the floor and proximate a leg of the seat.

8. The system of claim 7, wherein said bus includes a fiber optic system.

9. The system of claim 7, wherein said bus includes a receptacle defined by said two sidewalls which include a first conductive prong and a second conductive prong respectively that are operable to receive said connector and to provide an electrical connection between said connector and said bus.

10. The system of claim 7, wherein said bus is comprised of copper.

11. The system of claim 7, wherein said connector extends from a leg of said seat through said seat track to cooperate with said bus.

12. The system of claim 7, wherein said bus extends between said seats and a source of said signals.

13. The system of claim 7, further comprising a subsystem for distributing said signals throughout said seats, said subsystem is connected to a second seat track to ground said subsystem.

14. A method for distributing signals throughout an aircraft passenger cabin comprising:
- mounting a seat track having a plurality of openings to a sub floor between the sub floor and a passenger cabin floor such that a portion of the seat track is exposed at the cabin floor;
- mounting one or more passenger seats to the seat track;
- mounting a bus to the sub floor at a position spaced apart from the seat track and in vertical alignment with the openings, the bus operable to conduct the signals along substantially an entire length of the bus, the bus including a base portion and two side walls extending from the base portion, each of the side walls include a contact that is spaced apart from the base portion and the floor surface;
- mounting one or more passenger seats to the seat track at the cabin floor; and
- mating a connector of the seats with the contacts of the bus to conduct the signals between the bus and the subsystem by inserting the connector through one of the openings in the seat track.

15. The method of claim 14, further including the operation of providing the bus with a fiber optic system.

16. The method of claim 14, further including the operation of providing the bus with copper conductors.

17. The method of claim 14, further including the operation of positioning the bus between the seats and a source of the signals.

* * * * *